(12) United States Patent
Park et al.

(10) Patent No.: US 9,201,586 B2
(45) Date of Patent: Dec. 1, 2015

(54) MOBILE TERMINAL AND OPERATION CONTROL METHOD THEREOF

(71) Applicant: LG ELECTRONICS INC., Seoul (KR)

(72) Inventors: Minsoo Park, Seoul (KR); Moonkyung Kim, Seoul (KR); Sangwoon Lee, Gyeonggi-Do (KR); Jihye Ham, Gyeonggi-Do (KR); Minjin Lee, Seoul (KR); Harim Jang, Gyeonggi-Do (KR); Taehoon Cho, Seoul (KR); Younghoon Lee, Gyeonggi-Do (KR); Inyong Hwang, Gyeonggi-Do (KR); Hyoungmi Kim, Chungcheongnam-Do (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 13/712,489

(22) Filed: Dec. 12, 2012

(65) Prior Publication Data

US 2013/0169568 A1 Jul. 4, 2013

(30) Foreign Application Priority Data

Dec. 28, 2011 (KR) .......................... 10-2011-0145086

(51) Int. Cl.
*G06F 3/0488* (2013.01)

(52) U.S. Cl.
CPC .......... *G06F 3/0488* (2013.01); *G06F 3/04883* (2013.01)

(58) Field of Classification Search
CPC ....................................... G06F 3/0488–3/04883
USPC .................... 178/18.01–19.07; 345/173–178; 715/700–866
See application file for complete search history.

(56) References Cited

U.S. PATENT DOCUMENTS

| 8,046,721 | B2 | 10/2011 | Chaudhri et al. |
| 2004/0085351 | A1 | 5/2004 | Tokkonen |
| 2010/0248689 | A1 | 9/2010 | Teng et al. |
| 2010/0306693 | A1* | 12/2010 | Brinda .......................... 715/784 |
| 2011/0072400 | A1 | 3/2011 | Watanabe et al. |
| 2011/0256848 | A1* | 10/2011 | Bok et al. ...................... 455/411 |

FOREIGN PATENT DOCUMENTS

| CN | 101311891 | 11/2008 |
| CN | 101907968 | 12/2010 |
| CN | 102236515 | 11/2011 |

OTHER PUBLICATIONS

IP Australia Application Serial No. 2012254959, Office Action dated Aug. 27, 2013, 8 pages.
LG Electronics, Inc., "LG Vortex User Guide," 2010, 333 pages.
The State Intellectual Property Office of the People's Republic of China Application U.S. Appl. No. 201210552061.X Office Action dated Mar. 30, 2015, 8 pages.

* cited by examiner

*Primary Examiner* — Michael Pervan
(74) *Attorney, Agent, or Firm* — Lee, Hong, Degerman, Kang & Waimey

(57) ABSTRACT

A mobile terminal provides a guide and feedback for a lock release operation to implement a gesture for a lock release operation at an arbitrary location and in various directions. A method of releasing a user interface lock state in a mobile terminal having a touch sensing display according to an embodiment of the present disclosure may include setting the mobile terminal to a user interface lock state; detecting a contact with the touch sensing display at an arbitrary location on the touch sensing display; displaying a lock release region corresponding to the arbitrary location while maintaining a contact with the touch sensing display; displaying the movement of the contact in the lock release region; and switching the mobile terminal into a user interface lock release state when the movement of the contact in the lock release region satisfies a predetermined condition.

24 Claims, 21 Drawing Sheets

MOBILE TERMINAL AND OPERATION CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2011-0145086, filed on Dec. 28, 2011, the contents of which is incorporated by reference herein in its entirety.

BACKGROUND OF THE INVENTION

1. Field of the Invention

The present disclosure relates to a mobile terminal and an operation control method thereof, and more particularly, to a mobile terminal having a touch sensing display and a method of releasing a lock state thereof.

2. Description of the Related Art

Terminals can be classified into a mobile terminal and a stationary terminal based on its mobility. Furthermore, the mobile terminal can be further classified into a handheld terminal and a vehicle mount terminal based on whether or not it can be directly carried by a user.

As it becomes multifunctional, the terminal can be allowed to capture still images or moving images, play music or video files, play games, receive broadcast and the like, so as to be implemented as an integrated multimedia player. Moreover, the improvement of the terminal may be taken into consideration in the aspect of structure or software to support and enhance the function of the terminal.

As an example, a mobile terminal having a touch screen may provide a function of entering a lock state when a predetermined condition is satisfied and a function of releasing the lock state through a predetermined procedure in an attempt for solving a problem that an unintentional function is activated or deactivated by an unintentional contact of the touch screen in the mobile terminal.

SUMMARY OF THE INVENTION

An embodiment of the present disclosure is to provide a mobile terminal for providing a guide and feedback for a lock release operation to implement a gesture for a lock release operation at an arbitrary location and in various directions and a method of releasing a user interface lock state thereof.

Another embodiment of the present disclosure is to provide a mobile terminal for providing a guide and feedback for a lock release operation using an application or event for an intuitive operation and a method of releasing a user interface lock state thereof.

A method of releasing a user interface lock state in a mobile terminal having a touch sensing display according to an embodiment of the present disclosure may include setting the mobile terminal to a user interface lock state; detecting a contact with the touch sensing display at an arbitrary location on the touch sensing display; displaying a lock release region corresponding to the arbitrary location while maintaining a contact with the touch sensing display; displaying the movement of the contact in the lock release region; and switching the mobile terminal into a user interface lock release state when the movement of the contact in the lock release region satisfies a predetermined condition.

According to an embodiment, the method may be characterized in that said displaying a lock release region is displaying the lock release region using a lock release screen—the lock release screen is a screen displayed when the mobile terminal is switched into the user interface lock release state.

Furthermore, according to an embodiment, the method may be characterized in that the lock release screen is an idle screen or a screen displayed prior to the mobile terminal being set to the user interface lock state.

Furthermore, according to an embodiment, said displaying a lock release region may include dividing the lock release region into a plurality of sub-regions; changing at least one of location and size of the plurality of sub-regions, respectively; and displaying at least part of the lock release screen through a gap between the plurality of sub-regions.

Furthermore, according to an embodiment, the method may be characterized in that said displaying the movement of the contact is allowing at least one sub-region corresponding to the movement of the contact to be disappeared.

Furthermore, according to an embodiment, the method may be characterized in that said changing at least one of location and size thereof is changing at least one of location and size of the plurality of sub-regions, respectively, based on at least one of time, area, pressure and speed of the contact.

Furthermore, according to an embodiment, the method may be characterized in that said displaying a lock release region is displaying at least part of the lock release screen in a partial manner, and said displaying the movement of the contact is displaying at least part of the lock release screen in a complete manner.

Furthermore, according to an embodiment, said displaying a lock release region may include dividing the lock release region into a plurality of sub-regions; controlling the transparency of the plurality of sub-regions, respectively; and displaying at least part of the lock screen through the plurality of sub-regions.

Furthermore, according to an embodiment, said displaying a lock release region may include displaying a visual queue reflecting a movement direction of the contact required to release the lock of the mobile terminal.

Furthermore, according to an embodiment, the method may be characterized in that the predetermined condition is that the movement of the contact passes over a predetermined area.

Furthermore, according to an embodiment, the method may further include maintaining the user interface lock state when the movement of the contact does not satisfy the predetermined condition.

On the other hand, a mobile terminal according to an embodiment of the present disclosure may include a touch sensing display; and a controller configured to set the mobile terminal to a user interface lock state, and detect a contact with the touch sensing display at an arbitrary location on the touch sensing display, and display a lock release region corresponding to the arbitrary location while maintaining a contact with the touch sensing display, and display the movement of the contact in the lock release region, and switch the mobile terminal into a user interface lock release state when the movement of the contact in the lock release region satisfies a predetermined condition.

On another hand, a method of releasing a user interface lock state in a mobile terminal having a touch sensing display according to another embodiment of the present disclosure may include displaying an object on the touch sensing display in a user interface lock state; detecting a contact with the touch sensing display at a location where the objected is displayed; displaying a lock release region corresponding to the location using a screen associated with the object while maintaining a contact with the touch sensing display; displaying the movement of the contact in the lock release region;

and switching the mobile terminal into a user interface lock release state when the movement of the contact in the lock release region satisfies a predetermined condition.

According to an embodiment, the method may further include displaying a screen associated with the object.

Furthermore, according to an embodiment, said displaying a lock release region may include dividing the lock release region into a plurality of sub-regions; changing at least one of location and size of the plurality of sub-regions, respectively; and displaying at least part of the screen associated with the object through a gap between the plurality of sub-regions.

Furthermore, according to an embodiment, the method may be characterized in that said displaying the movement of the contact is allowing at least one sub-region corresponding to the movement of the contact to be disappeared.

Furthermore, according to an embodiment, the method may be characterized in that said displaying a lock release region is displaying at least part of the screen associated with the object in a partial manner, and said displaying the movement of the contact is displaying at least part of the screen associated with the object in a complete manner.

Furthermore, according to an embodiment, the method may be characterized in that the screen associated with the object is an application or event corresponding to the object.

Furthermore, according to an embodiment, said displaying a lock release region may include displaying a visual queue reflecting a movement direction of the contact required to release the lock of the mobile terminal.

On still another hand, a mobile terminal according to still another embodiment of the present disclosure may include a touch sensing display; and a controller configured to display an object on the touch sensing display in a user interface lock state, and detect a contact with the touch sensing display at a location where the objected is displayed, and display a lock release region corresponding to the location using a screen associated with the object while maintaining a contact with the touch sensing display, and display the movement of the contact in the lock release region, and switch the mobile terminal into a user interface lock release state when the movement of the contact in the lock release region satisfies a predetermined condition.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
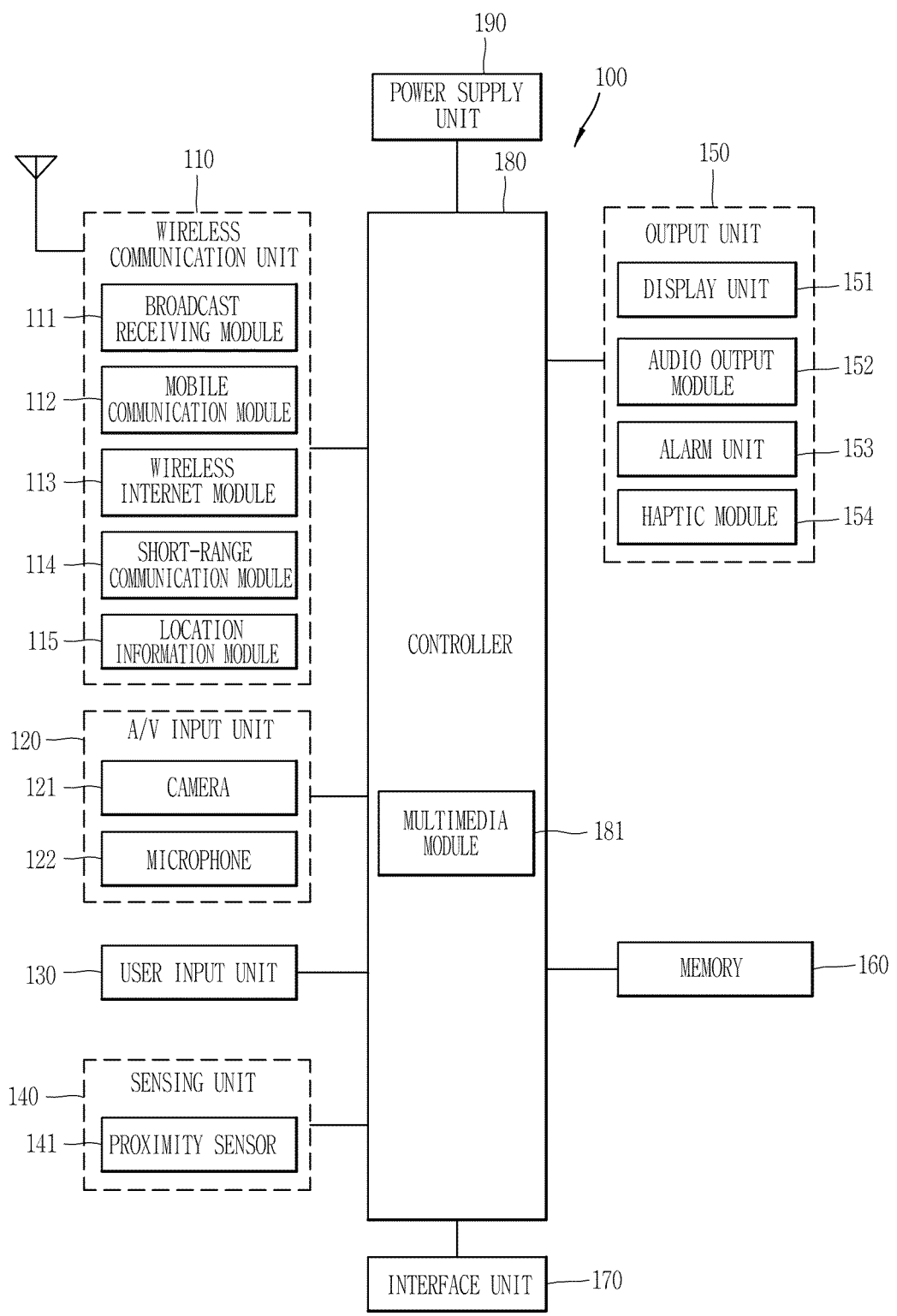
FIG. 1 is a block diagram illustrating a mobile terminal 100 associated with an embodiment of the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements. Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the users contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of explanation, the behavior of a sensing object being placed in proximity with the touch screen without being brought into contact with the touch screen may be referred to as a "proximity touch", whereas the behavior of a sensing object being brought into contact with the touch screen may be referred to as a "contact touch".

The proximity sensor 141 may sense the presence or absence of a proximity touch and a proximity touch pattern (for example, a proximity touch distance, a proximity touch direction, a proximity touch velocity, a proximity touch time, a proximity touch position, a proximity touch moving state, etc.) Information corresponding to the presence or absence of a proximity touch and the proximity touch pattern may be displayed on the touch screen.

The output unit 150 may generate an output associated with visual, auditory, tactile senses. The output unit 150 may include a display unit 151, an audio output module 153, an alarm unit 154, a haptic module 155, and the like.

The display unit 151 may display (output) information processed in the mobile terminal 100. For example, when the mobile terminal 100 is operated in a phone call mode, the display unit 151 may display a user interface (UI) or graphic user interface (GUI) associated with a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a three-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output an audio signal associated with a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 152, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 155 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 155 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2A:
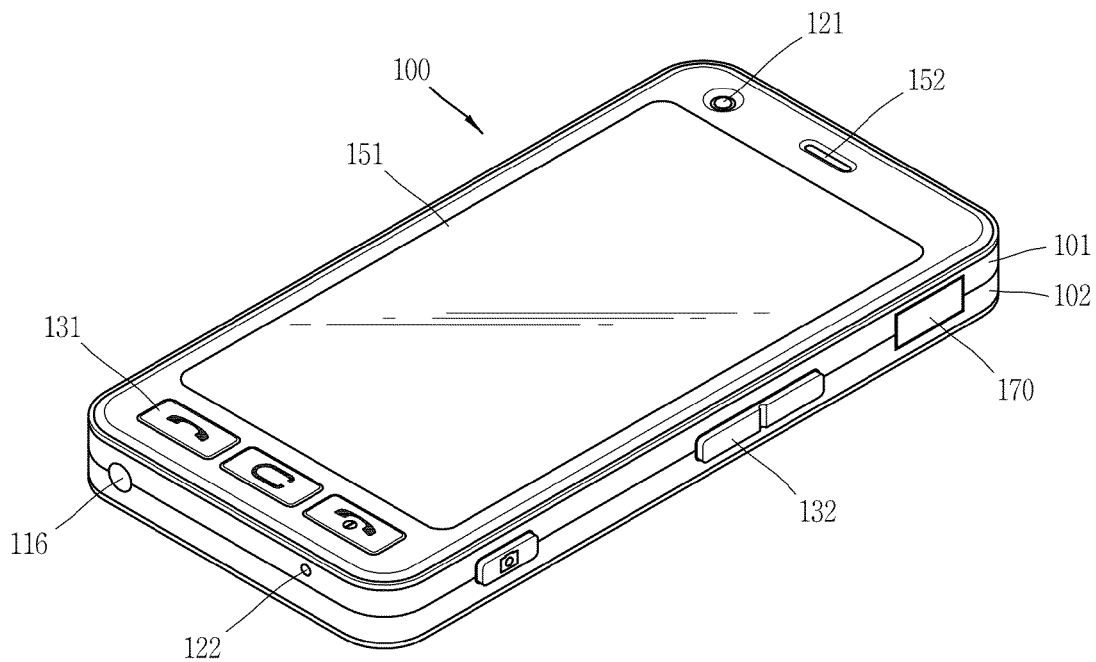
FIGS. 2A and 2B are perspective views illustrating the external appearance of a mobile terminal 100 associated with the present disclosure.
Figure 2B:
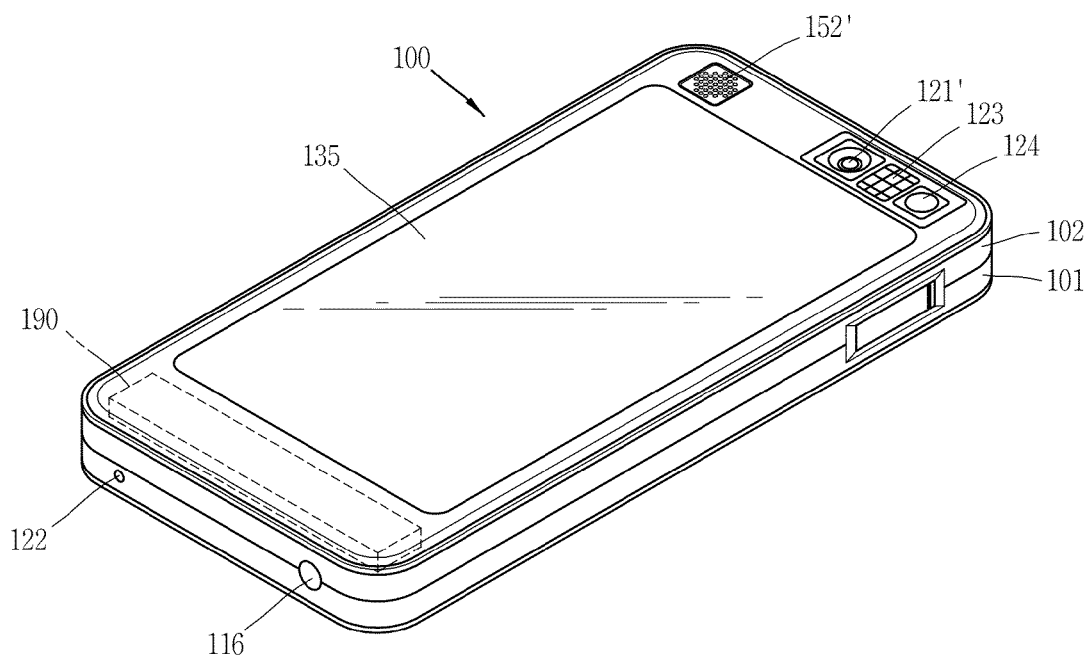

FIGS. 2A and 2B are perspective views illustrating the external appearance of a mobile terminal 100 associated with the present invention. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The manipulation units 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, that the front camera 121 may be configured to have a relatively small number of pixels, and the rear camera 121' may be configured to have a relatively large number of pixels. Accordingly, in case where the front camera 121 is used for video communication, it may be possible to reduce the size of transmission data when the user captures his or her own face and sends it to the other party in real time. On the other hand, the rear camera 121' may be used for the purpose of storing high quality images.

On the other hand, the cameras 121, 121' may be provided in the terminal body in a rotatable and popupable manner.

Furthermore, a flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

Furthermore, a rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

The mobile terminal 100 may have a plurality of user interface states. The user interface state is a state in which the mobile terminal 100 responds to the users input in a predetermined manner. According to an embodiment, the plurality of user interface states may include a user interface lock state and a user interface lock release state. According to an embodiment, the plurality of user interface states may include a plurality of application states.

In case of the user interface lock state (hereinafter, referred to as a "lock state"), the mobile terminal 100 can be powered on and operated but most of the users inputs are ignored even though all of them are not ignored. In other words, the mobile terminal 100 does not take any action in response to the users input and/or the implementation of a predetermined operation set in response to the users input is prohibited. The predetermined operation set may include a navigation between the activation and deactivation of a predetermined function set to the user interface. A lock state may be used to prevent the use of an unintentional or non-authenticated mobile terminal 100 or the activation or deactivation of a function on the mobile terminal 100. In case where the mobile terminal 100 is in a lock state, it may be said that the mobile terminal 100 is locked. According to an embodiment, the mobile terminal 100 in a lock state may respond to an input corresponding to an attempt for switching the mobile terminal 100 into a user interface lock release state or a restrictive user input set including an input corresponding to the power off of the mobile terminal 100. In other words, the mobile terminal 100 in a lock state responds to a user input corresponding to an attempt for switching the mobile terminal 100 into a user interface lock release state or turning power off the mobile terminal 100, but does not respond to a user input corresponding to a navigation attempt between user interfaces. Even if the mobile terminal 100 ignores a user input, during the detection of the input, the mobile terminal 100 should recognize to provide a sensing feedback (such as a visual, auditory or vibration feedback) displaying that the input will be still ignored to the user.

In an embodiment of the mobile terminal 100 having a touch screen, while the mobile terminal 100 is in a lock state, for a predetermined operation set such as a navigation between user interfaces, the operation responding to a contact on the touch screen when the mobile terminal 100 is in a lock state will be prohibited. In other words, when a contact is ignored by the locked mobile terminal 100, it may be said that the touch screen is locked. However, the locked mobile terminal 100 may still respond to a contact in a limited range on the touch screen. The limited range may include a contact determined by the mobile terminal 100 corresponding to an attempt for switching the mobile terminal 100 into a user interface lock release state.

In case of a user interface lock release state (hereinafter, referred to as a "lock release state"), the mobile terminal 100 is in a normal operation state, and detects and responds to a user input corresponding to an interaction with a user interface. The mobile terminal 100 in a lock release state may be referred to as a lock released mobile terminal 100. The lock released mobile terminal 100 detects and responds to a user input for activating or deactivating a navigation between user interfaces, a data input and a function. In the mobile terminal 100 including a touch screen according to an embodiment, the lock released mobile terminal 100 detects and responds to a contact corresponding to the activation and deactivation of a navigation between user interfaces, a data input and a function through the touch screen.

Figure 3:
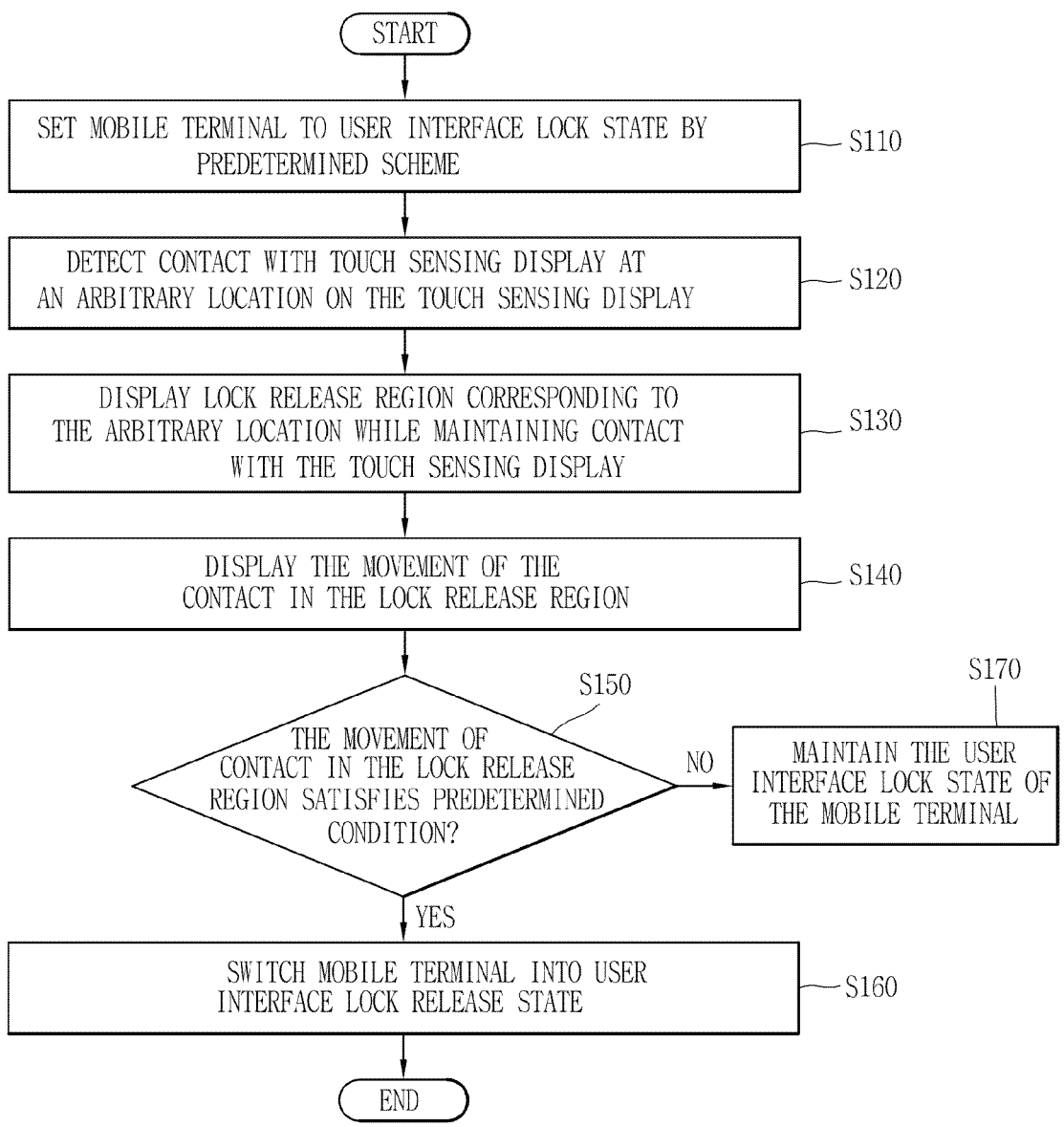
FIG. 3 is a flow chart illustrating the process of switching the mobile terminal 100 into a user interface lock release state according to an embodiment of the present disclosure.

FIG. 3 is a flow chart illustrating the process of switching the mobile terminal 100 into a user interface lock release state according to an embodiment of the present disclosure. As used herein, switching from a state to another state refers to performing a process from a state to another state. The process may be carried out at once, substantially at once, at gradual or other suitable speed. The progress of the process may be automatically controlled by a device such as the mobile terminal 100 regardless of the user or controlled by the user when the process is activated once. The process flow described below may include numerous operations seemed to occur in a specific sequence, but it should be recognized that such a process may include a greater or less number of operations that can be implemented in series or parallel (for example, using a parallel processor or multi-threading environment).

The mobile terminal 100 is set to a lock state (S110). The mobile terminal 100 may be set to a lock state when one or more lock conditions are satisfied (in other words, complete switching from another state to a lock state). The lock condition may include an event such as passing a predetermined deactive time, entering an active call, or turning power on the mobile terminal 100. The lock condition may include the users intervention, namely, the user's action of locking the mobile terminal 100 by a predetermined user input. In some embodiments, the user may specify an event to be functioned as a lock condition. For example, the user may configure the mobile terminal 100 to be switched to a lock state, not when the mobile terminal 100 is powered on, but when a predetermined deactive time has passed. In a lock state, the mobile terminal 100 may display a predetermined screen to be displayed in the lock state.

The lock release operation may include a contact with the touch screen. According to an embodiment, the lock release operation is a gesture for satisfying a predetermined condition carried out on the touch screen. As used herein, the gesture is a motion of an object/accessory brought into contact with the touch screen. For example, the gesture for satisfying a predetermined condition may include a contact with the touch screen at an arbitrary tile (assumed that the touch screen is divided into a plurality of tiles) (a start of the gesture), a movement of a touch position to a tile adjacent to the contacted tile while maintaining the contact with the touch screen, repetition of the movement of a contact position as many as a predefined number of tiles (an end of the gesture).

While the touch screen is locked, the user may start a contact with the touch screen, namely, give a touch to the touch screen. For the convenience of description, according to the present embodiment and the following embodiment, it is described below that a touch on the touch screen is carried out by the user using at least one hand using at least one or more fingers. However, it should be recognized to be brought into contact with using another suitable object or accessory such as a stylus, a finger, and the like. The contact may include one or more taps to the touch screen while maintaining a continuous contact with the touch screen, a movement of a contact position while maintaining a continuous contact, termination of a contact, or a combination thereof.

The mobile terminal 100 detects a contact at an arbitrary location on the touch screen (S120). The arbitrary location refers to any one (for example, an edge or middle position) of a plurality of locations previously determined to detect a contact on the touch screen. For example, when a contact is detected in the entire region of the touch screen, any one location of the entire region may be the arbitrary location. When a contact is detected in a partial region of the touch screen, any one location of the partial region may be the arbitrary location. In this case, the mobile terminal 100 allows the partial region to be displayed in a distinguished manner, thereby allowing the user to recognize a region that should be brought into contact with. The mobile terminal 100 allows the entire region of the touch screen to be divided into a plurality of tiles such as rectangles having a predetermined size, thereby acquiring information on a tile corresponding to any location at which a contact is detected on the touch screen.

The mobile terminal 100 displays a lock release region corresponding to any location at which a contact is detected on the touch screen while maintaining the contact with the touch screen (S130). The lock release region is a screen set to be displayed in a lock release state, for example, displaying an idle screen or a screen displayed prior to the mobile terminal 100 being set to a lock state in step S110. For example, at least one of location and size of surrounding adjacent tiles including a tile corresponding to any location at which a contact is detected on the touch screen may be changed, thereby allowing the lock release screen to be displayed through a gap between tiles. The tiles may be moved during the process of being rearranged and while the lock release region is displayed on the touch screen. For example, the tiles may be moved while being rotated through their own axes. While information displayed by each tile itself is contained as it is, at least one of location and size thereof is changed to be displayed. A mismatch of boundaries can generate a gap while the tiles are rearranged in an arbitrary manner. The mobile terminal 100 can reveal a lock release screen that has been hidden by the lock screen through a gap. The lock release region implies that the movement of a contact carried out in the lock release region can switch the mobile terminal 100 into a lock release state. In other words, a border of the lock release region reflects a boundary line of the lock release operation. Accordingly, the user recognizes that the lock state of the mobile terminal 100 can be released by moving a contact from an inside of the lock release region to an outside of the lock release region on the touch screen.

The mobile terminal 100 displays the movement of a contact in the lock release region (S140). The movement of a contact in the lock release region may be a feedback to the user's gesture for releasing the lock. For example, at least one tile corresponding to the movement of a contact in the lock release region among tiles formed in the step S130 may be allowed to be disappeared to display the movement of a contact in the lock release region. Accordingly, the user can recognize that the lock state is released according to the movement of a contact so that the lock release screen can be completely displayed as well as recognize that the movement of a contact in the lock release region is being properly carried out. It may be a guideline for the user to perform a lock release operation.

When the movement of a contact corresponds to a successful behavior of the lock release operation in step S150, namely, when the user successfully performs the lock release operation, the mobile terminal 100 is switched into a lock release state (S160). For example, when the lock release operation is a contact with the touch screen at an arbitrary tile (a start of the gesture), a movement of a touch position to a tile adjacent to the arbitrary tile while maintaining the contact with the touch screen, repetition of the movement of a contact position as many as a predefined number of tiles (an end of the gesture), the mobile terminal 100 is switched into a lock release state.

When the contact does not correspond to an attempt for performing a lock release operation or the contact corresponds to a failure or suspension of the attempt by the user performing a lock release operation in step S150, the mobile terminal 100 maintains a lock release state (S170). For example, when the lock release operation is a contact with the touch screen at an arbitrary tile (a start of the gesture), a movement of a touch position to a tile adjacent to the arbitrary tile while maintaining the contact with the touch screen, repetition of the movement of a contact position as many as a predefined number of tiles (an end of the gesture), the mobile terminal 100 maintains a lock state because the contact does not correspond to a lock release operation.

According to an embodiment, the mobile terminal 100 starts the process of switching into a lock release state when detecting any contact on the touch screen and suspends the switching immediately when the contact does not correspond to a lock release operation or is determined as a failed/suspended lock release operation. For example, when the lock release operation is a gesture satisfying a predetermined condition, the mobile terminal 100 starts the process of switching into a lock release state immediately when detecting a contact of the initial gesture, and continuously advances the switching when the gesture is carried out. If the user suspends the gesture prior to completing the switching, then the mobile terminal 100 suspends the switching and remains in a lock state. If the gesture is completed, then the mobile terminal 100 completes the switching into a lock release state. For another example, when the lock release operation is a horizontal movement of the contact position for crossing the touch screen while maintaining a continuous contact with the touch screen and the user taps the touch screen once, the mobile terminal 100 starts a state switching process while sensing the tap but immediately suspends the process since it is recognized that the tap is merely a tap and does not correspond to the lock release operation.

When the mobile terminal 100 is lock-released, the mobile terminal 100 may display user interface objects corresponding to one or more functions and/or information interested by the user on the touch screen. As an object constituting a user interface of the mobile terminal 100, the user interface object may unrestrictedly include a text, an image, an icon, a soft key (or "virtual button"), a pull down menu, a radio button, a check box, a selectable list, and the like. The displayed user interface object may include a non-interactive object with an attribute for transferring information or viewing and feeling the user interface, an interactive object for interacting with the user or a combination thereof. The user may make contact with the touch screen at one or more locations of the touch screen corresponding to an interactive object to interact therewith, thereby interacting with the user interface object. The mobile terminal 100 may perform an operation corresponding to an interaction with the interactive object to detect a contact and respond to the detected contact.

When the mobile terminal 100 is locked, the user can make contact with the touch screen. However, the locked mobile terminal 100 is prohibited to perform a predetermined operation set in response to the detected contact until the mobile terminal 100 is lock-released. The prohibited predetermined operation set may include a navigation between user interfaces and data input by the user.

According to an embodiment, the mobile terminal 100 displays one or more visual cues for a lock release operation by which the user can perform lock release on the touch screen. A visual cue provides a hint or the remainder of the lock release operation to the user. The visual cue may be a text, a graphic or a combination thereof. According to an embodiment, the visual cue is displayed when a specific event occurs while the mobile terminal 100 is locked. The specific event for starting the display of a visual cue may include an incoming call or message, or other events requiring the users notice. According to an embodiment, the visual cue may be displayed during a specific user input such as when the user interacts with a menu button, when the user makes contact with a locked touch screen and/or when the user interacts with other input/control devices. When a visual cue is not displayed thereon, the locked mobile terminal 100 may reduce the power consumption of the touch screen (helpful to power reservation) or display other objects such as information interested by the user (for example, a remaining amount of battery, date and time, and network strength) on the touch screen.

If a contact is detected on the touch screen while the mobile terminal 100 is locked, then the mobile terminal 100 may display one or more visual cues to the lock release operation. According to an embodiment, the mobile terminal 100 may display a lock release region along with the visual cue. According to an embodiment, when the lock release operation is not completed, the display of GUI may display a reverse advancement into a lock state.

According to an embodiment, the mobile terminal 100 provides a non-visual feedback in addition to a visual feed to display the advancement to the completion of a lock release operation. The additional feedback may include an auditory feedback (for instance, sound) or a physical feedback (for instance, vibration).

FIGS. 4A through 4E are views illustrating the display of GUI at various positions where a lock release operation gesture is taken according to an embodiment of the present disclosure.

Figure 4A:
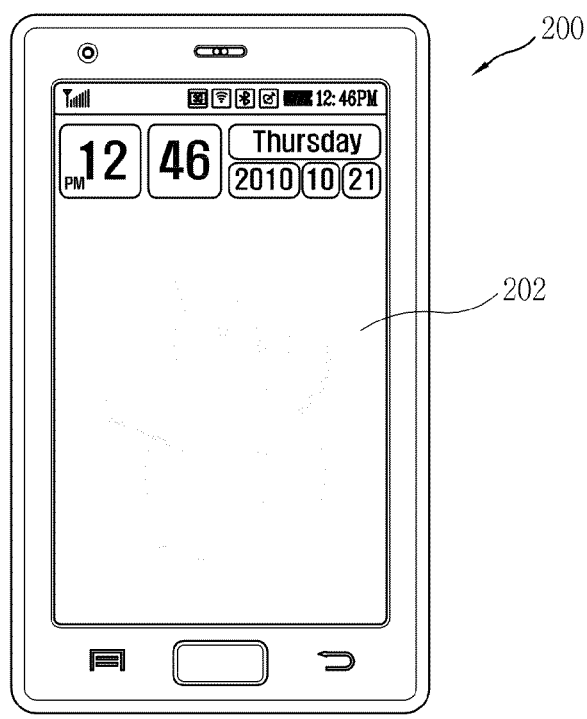
FIGS. 4A through 4E are views illustrating the display of GUI at various positions where a lock release operation gesture is taken according to an embodiment of the present disclosure.

Referring to FIG. 4A, the mobile terminal 200 may include a touch screen for displaying a lock screen 202 in a lock state. According to an embodiment, the touch screen may be in a sleep mode and/or a state in which nothing is displayed thereon at first, and may be displayed by the mobile terminal 100 when an event requiring the user's notice occurs (for example, incoming call or message) or during the users intervention (for example, a menu button (not shown) for displaying a lock screen is displayed while the mobile terminal 100 is locked). The lock screen 202 may cover a lock release screen.

Figure 4B:
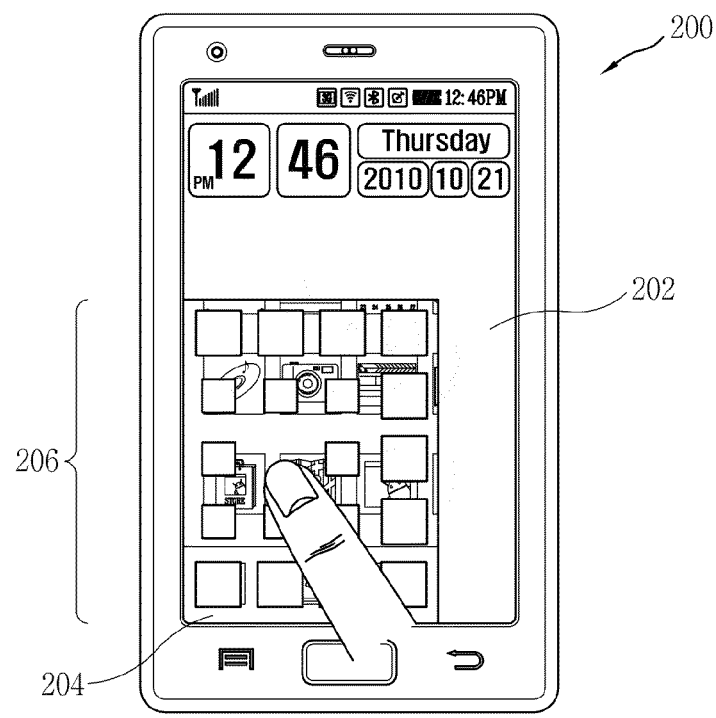

Referring to FIG. 4B, the user makes contact with the touch screen of the mobile terminal 200 using his or her finger to start a lock release operation. The user can make contact with the touch screen at an arbitrary location. The users contact to the touch screen at an arbitrary location is detected by the mobile terminal 200, and the mobile terminal 200 displays a lock release region 206 corresponding to the contacted location. The lock release region 206 may be displayed on the touch screen while the contact on the touch screen is maintained. As described above, the mobile terminal 100 may divide the touch screen into a plurality of tiles, and reconfigure at least one of location and size of tiles constituting the lock release region 206 including a tile corresponding to the location brought into contact by the user on the touch screen to reveal the lock release screen 204 at a gap between tiles. In this case, the mobile terminal 100 may allow a tile corresponding to the location brought into contact by the user on the touch screen to be disappeared to completely reveal the lock release screen for the disappeared tile portion.

Figure 4C:
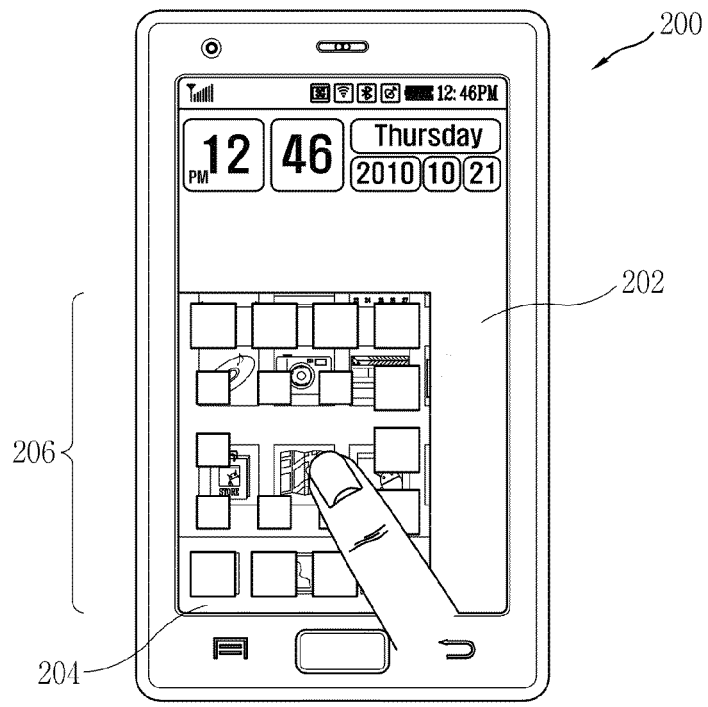

Referring to FIG. 4C, the user moves his or her finger while maintaining a continuous contact with the touch screen, thereby participating in the process of taking a gesture. As a result of the gesture, a tile corresponding to the location brought into contact by the user on the touch screen may be disappeared by the movement of the contact to completely reveal the lock release screen for the disappeared tile portion. In this case, an animation effect may be implemented such that a tile corresponding to the movement of the contact is rotated around a predetermined axis, flown out of the screen, or disappeared.

Figure 4D:
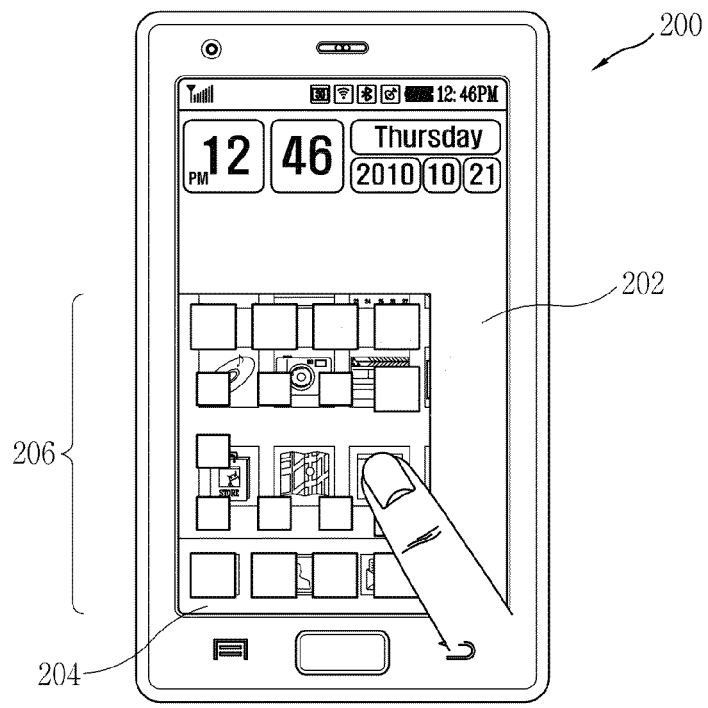
Figure 4E:
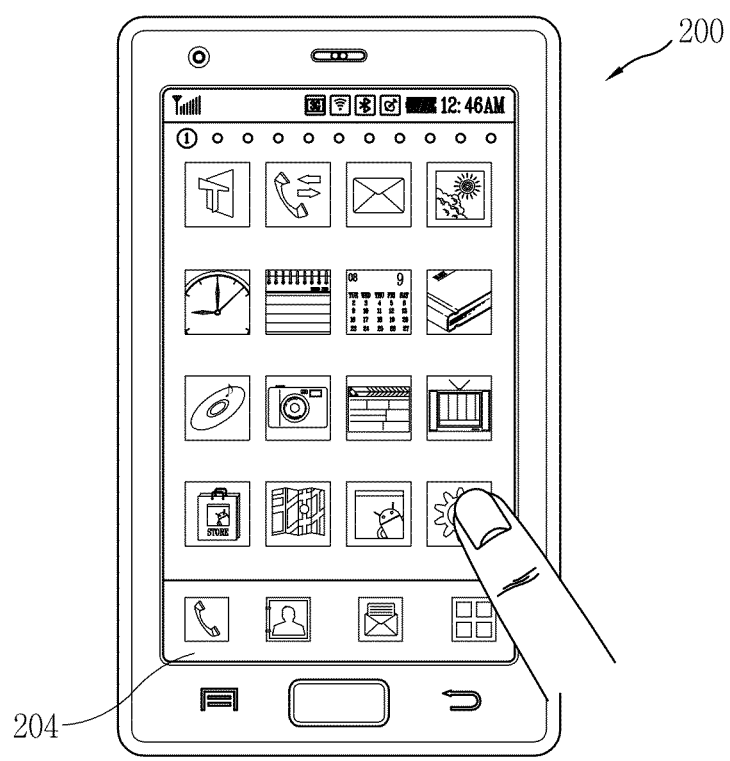

Referring to FIG. 4D, the user moves his or her finger while maintaining a continuous contact with the touch screen, thereby participating in the process of taking a gesture. As a result of the gesture, a tile corresponding to the location brought into contact by the user on the touch screen may be disappeared by the movement of the contact to completely reveal the lock release screen for the disappeared tile portion. When the movement of the user's contact satisfies a predetermined condition (for example, when brought into contact with three or more tiles), and if the user releases his or her finger from the touch screen, then the lock release operation is completed. During the completion of a lock release gesture, the mobile terminal 200 is lock-released to display a user interface object associated with a normal operation of the mobile terminal 200. FIG. 4E illustrates an example of a user interface object that can be displayed when the mobile terminal 200 is lock-released.

Referring to FIG. 4E, the mobile terminal 200 displays the lock release screen 204. The lock release screen 204 may include at least one menu. The menu may include interactive user interface objects corresponding to various application or operations. The user interacts with the user interface object to perform application activation or operation. However, when lock release is carried out, the mobile terminal 200 may display an additional or alternative user interface object.

Figure 5A:
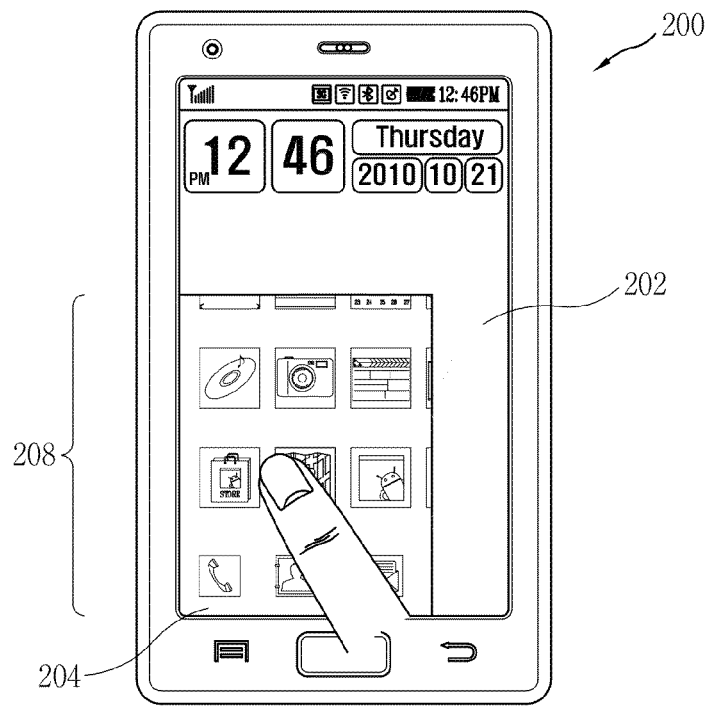
FIGS. 5A through 5C are views illustrating the display of GUI at various positions where a lock release operation gesture is taken according to another embodiment of the present disclosure.
Figure 5B:
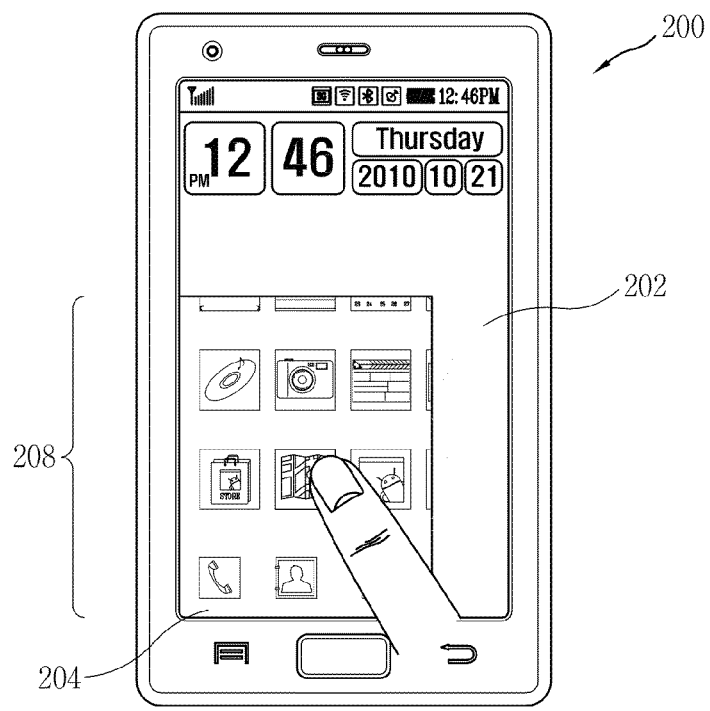
Figure 5C:
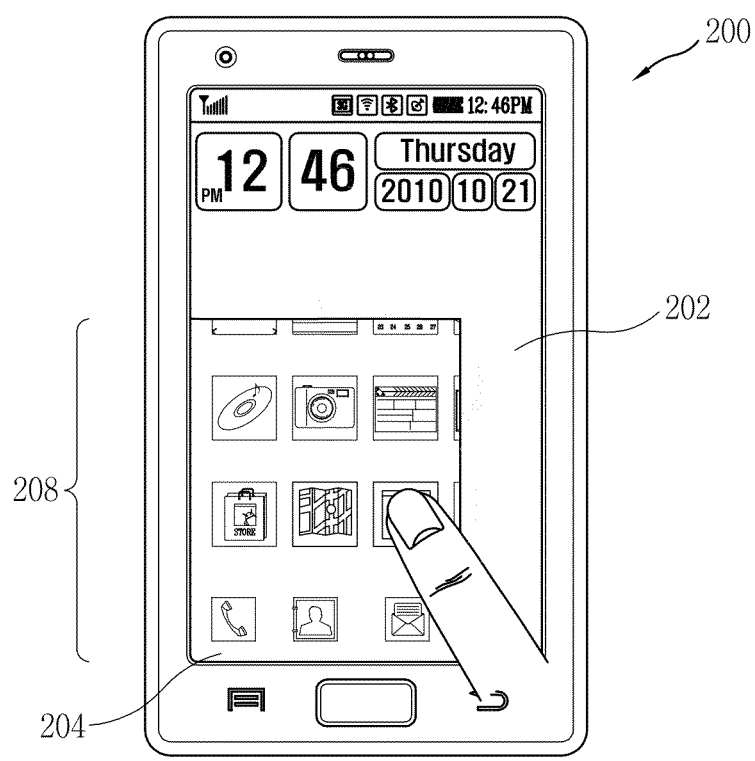

FIGS. 5A through 5C are views illustrating the display of GUI at various positions where a lock release operation gesture is taken according to another embodiment of the present disclosure.

Alternatively, in FIGS. 5A through 5C, the mobile terminal 200 may provide a guide and feedback for a lock release operation to the user in a different manner from the foregoing tile effect.

Referring to FIG. 5A, the user make contact with the touch screen of the mobile terminal 200 using his or her finger to start a lock release operation. Similarly, the user can make contact with the touch screen at an arbitrary location. The users contact with the touch screen at an arbitrary location is detected by the mobile terminal 200, and the mobile terminal 200 displays a lock release region corresponding to the contacted location. The lock release region may be continuously displayed while the user maintains a contact on the touch screen. The mobile terminal 200 allows the lock release screen to be displayed through the lock release region by reducing the transparency of the lock release region. In this case, the mobile terminal 100 may reduce the transparency of a portion corresponding to the location brought into contact by the user on the touch screen to the lowest level, thereby remarkably revealing the lock release screen for the portion. During the process of controlling the transparency, a wave may be generated from a portion brought into contact with collected water by the finger to implement an effect of water being cleared away.

Referring to FIG. 5B, the user moves his or her finger while maintaining a continuous contact with the touch screen, thereby participating in the process of taking a gesture. As a result of the gesture, the transparency of a portion corresponding to the location brought into contact by the user on the touch screen by the movement of the contact may be reduced to the lowest level to completely reveal the lock release screen for the relevant portion.

Referring to FIG. 5C, the user moves his or her finger while maintaining a continuous contact with the touch screen, thereby participating in the process of taking a gesture. As a result of the gesture, the transparency of a portion corresponding to the location brought into contact by the user on the touch screen may be reduced to the lowest level by the movement of the contact to completely reveal the lock release screen for the relevant portion. When the movement of the users contact satisfies a predetermined condition (for example, when brought into contact with three or more tiles), and if the user releases his or her finger from the touch screen, then the lock release operation is completed. During the completion of a lock release gesture, the mobile terminal 200 is lock-released to display a user interface object associated with a normal operation of the mobile terminal 200 as illustrated in the foregoing FIG. 4E.

Figure 6A:
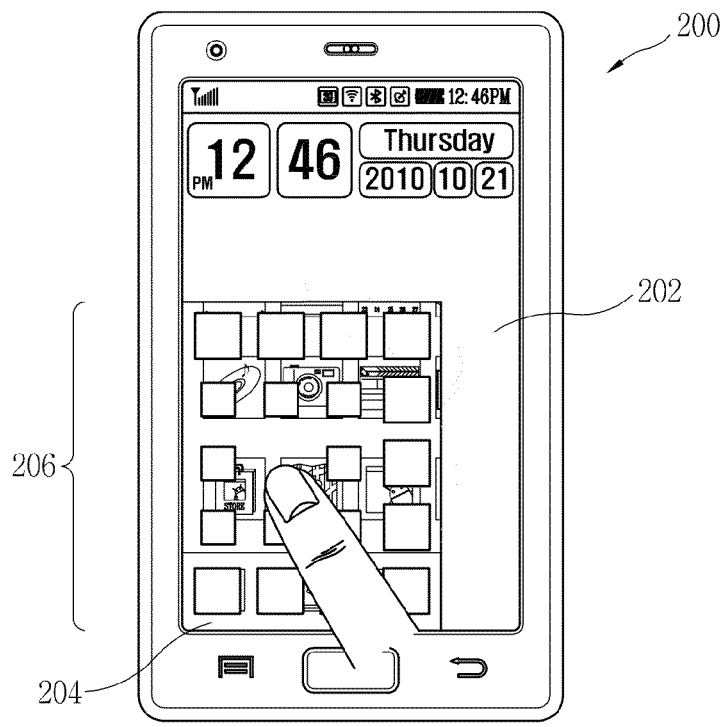
FIGS. 6A and 6B are views illustrating the display of GUI according to the start of the lock release operation gesture according to an embodiment of the present disclosure.
Figure 6B:
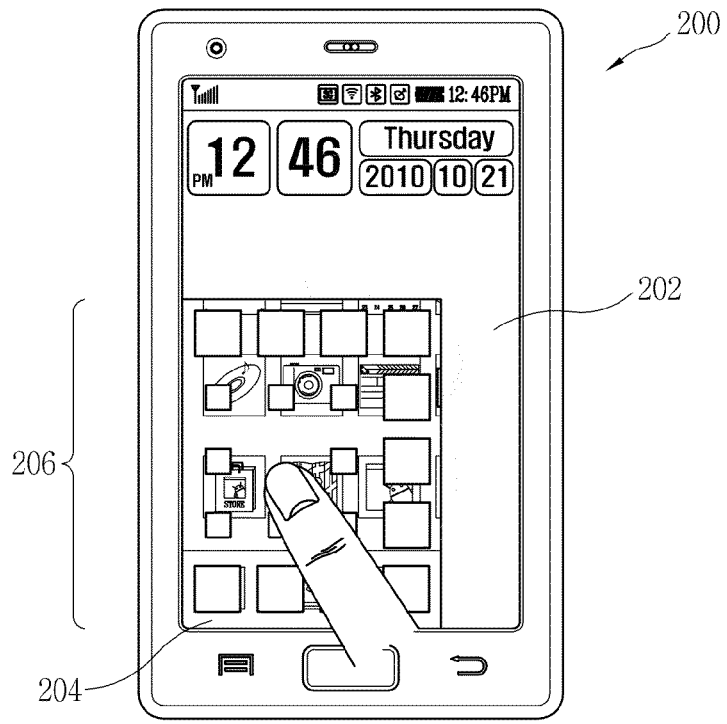

FIGS. 6A and 6B are views illustrating the display of GUI according to the start of the lock release operation gesture according to an embodiment of the present disclosure.

Referring to FIG. 6A, as described above, the mobile terminal 100 may divide the touch screen into a plurality of tiles, and reconfigure at least one of location and size of tiles constituting the lock release region 206 including a tile corresponding to the location brought into contact by the user on the touch screen to reveal the lock release screen 204 at a gap between tiles. In this case, the mobile terminal 100 may allow a tile corresponding to the location brought into contact by the user on the touch screen to be disappeared to completely reveal the lock release screen for the disappeared tile portion. As described above, the mobile terminal 100 may divide the touch screen into a plurality of tiles. At least one of location and size of tiles constituting the lock release region 206 including a tile corresponding to the location brought into contact by the user on the touch screen may be changed. Accordingly, the lock release screen 204 may be revealed at a gap between tiles. In this case, an effect may be implemented such that at least one of location and size of tiles constituting the lock release screen 204 is concaved around the contacted location. It means an effect that a tile corresponding to the center of the lock release region 206 is displayed to be visually concaved in the largest scale (by reducing the tile size or reducing the depth value), and tiles located at the outside thereof are displayed to be gradually concaved in a small scale (by increasing the tile size or increasing the depth value). The size of a gap between tiles may vary according to the size and location of the tiles. Accordingly, a three-dimensional effect may be formed in the lock release region 206. On the other hand, the attribute of a contact may determine a level of the three-dimensional effect in the lock release region 206. For example, the level of the three-dimensional effect formed by tiles constituting the lock release region 206 may be determined based on at least one of time, area, pressure and speed of the contact with the touch screen.

Referring to FIG. 6B, when the user makes contact with the touch screen for a more long time, through a larger area, with a more stronger pressure, or with a quicker speed, a relative size difference may be increased as tiles constituting the lock release region 206 are located away from the center to the outside. A greater three-dimensional effect may be formed as increasing the relative size difference between tiles, and it means that a larger portion of the lock release screen 204 can be revealed in the lock release region 206.

Figure 7A:
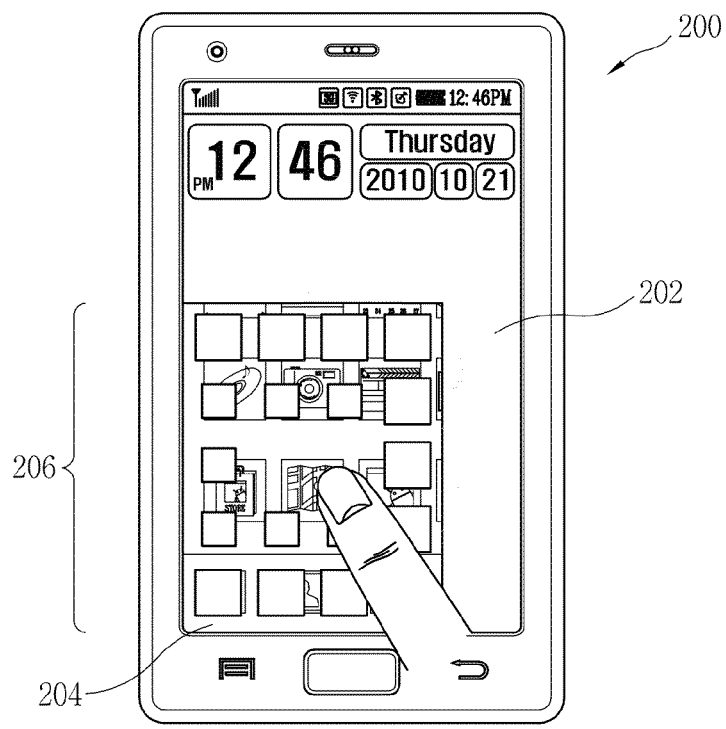
FIGS. 7A through 7C are views illustrating the display of GUI according to the suspension of the lock release operation gesture according to an embodiment of the present disclosure.
Figure 7B:
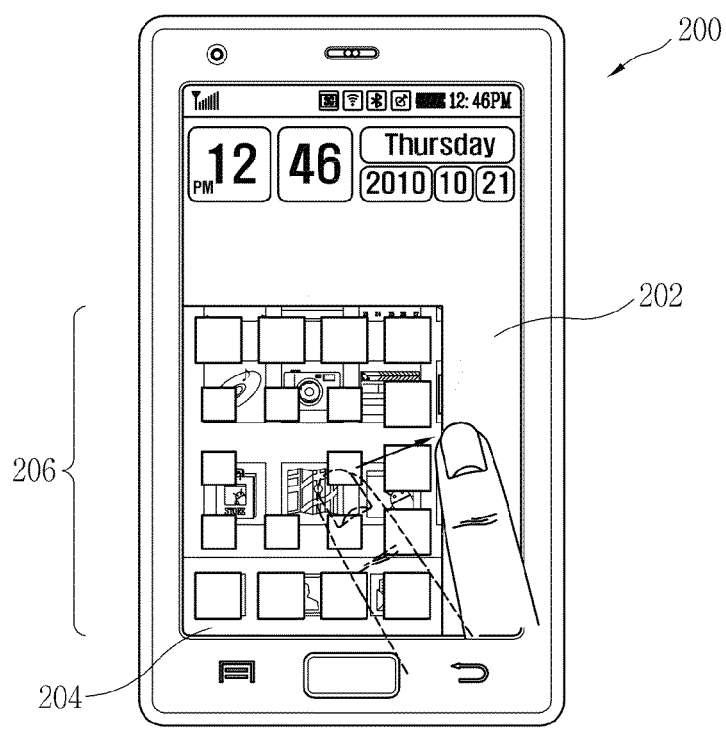
Figure 7C:
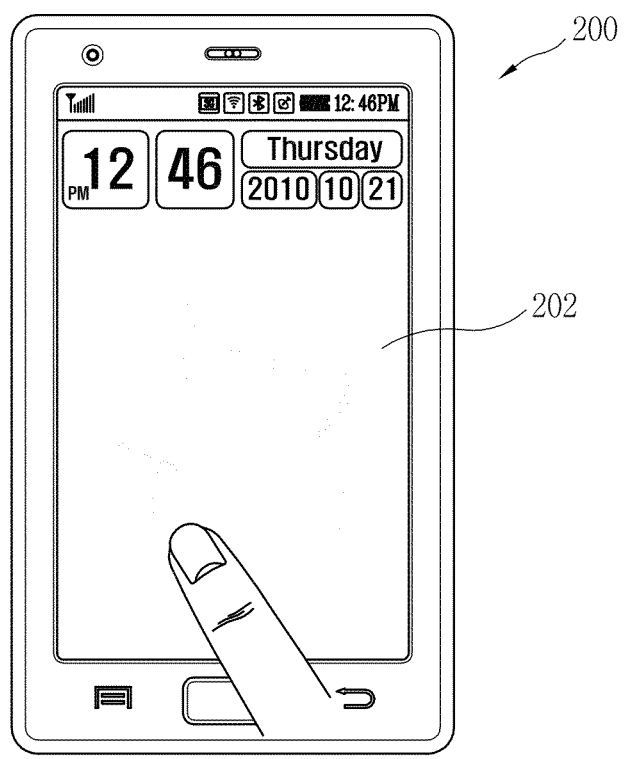

FIGS. 7A through 7C are views illustrating the display of GUI according to the suspension of the lock release operation gesture according to an embodiment of the present disclosure.

According to an embodiment, when the operation of a lock release operation is failed, the lock release region is disappeared again.

Referring to FIG. 7A, the user makes contact with an arbitrary location on the touch screen, and moves the contact, thereby providing a feedback indicating the movement of the contact. For example, a portion corresponding to the relevant tile of the lock release screen 204 may be remarkably displayed by allowing a tile corresponding to the movement of the contact to be disappeared.

Referring to FIG. 7B, when the users contact with the touch screen is suspended prior to satisfying a predetermined condition (for example, making contact with three tiles), the lock release operation is failed. When selected by the user, the mobile terminal 200 may restore tiles constituting the lock release region 206 and tiles that has been disappeared to an original state while allowing the user to attempt a lock release operation again. In this case, tiles constituting the lock release region 206 and tiles that has been disappeared may be restored to an original state along with an animation effect such as reproducing a content in a reverse manner while reproducing and rewinding the content.

Referring to FIG. 7C, the mobile terminal 200 returns to a state prior to the user making contact on the touch screen. In other words, the initially displayed lock screen 202 is displayed on the touch screen. The mobile terminal 200 returns to a sleep mode again when any gesture is not taken for a predetermined period of time.

Figure 8:
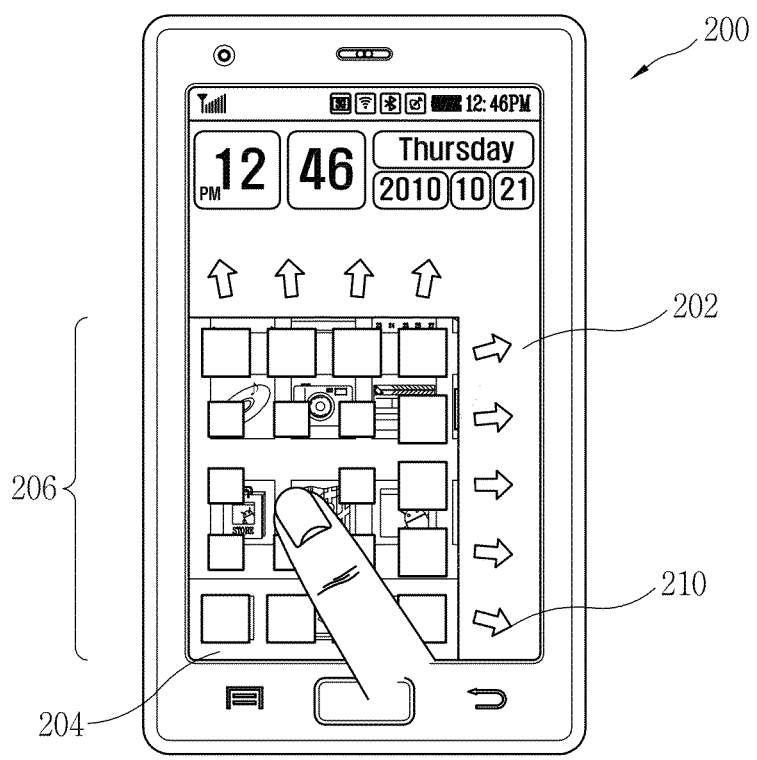
FIG. 8 is a view illustrating the display of GUI according to a lock release operation gesture according to an embodiment of the present disclosure.

FIG. 8 is a view illustrating the display of GUI according to a lock release operation gesture according to an embodiment of the present disclosure.

Referring to FIG. 8, the user's contact with the touch screen at an arbitrary location is detected by the mobile terminal 200, and the mobile terminal 200 reveals the lock release screen 204 in the lock release region 206 containing a tile at the contacted location. At the same time, the mobile terminal 200 displays a visual cue. The illustrated visual cue indicates a path along which a contact should be moved by the user to release the lock state of the mobile terminal 200 subsequent to making contact with the touch screen. The visual cue may include one or more arrows 210 indicating movement directions. The visual cue reminds the user that the movement from a position where the user's contact is started to a path indicated by the visual cue satisfies a predetermined condition for releasing the lock state of the mobile terminal 200. However, it should be understood that a visual cue illustrated in FIG. 8 is merely illustrative, and a greater or less number of visual cues or other visual cues or other sensitive cues such as vibration (tactile cue) can be used. The content with a visual cue may reflect a feature of the lock release operation.

Figure 9A:
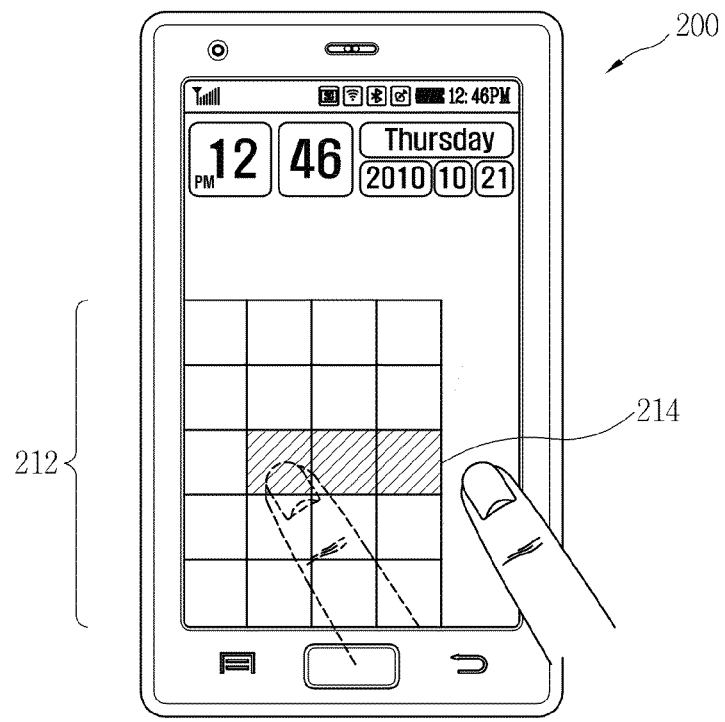
FIGS. 9A and 9B are exemplary views illustrating a case where a lock release operation gesture satisfies a lock release condition according to an embodiment of the present disclosure.
Figure 9B:
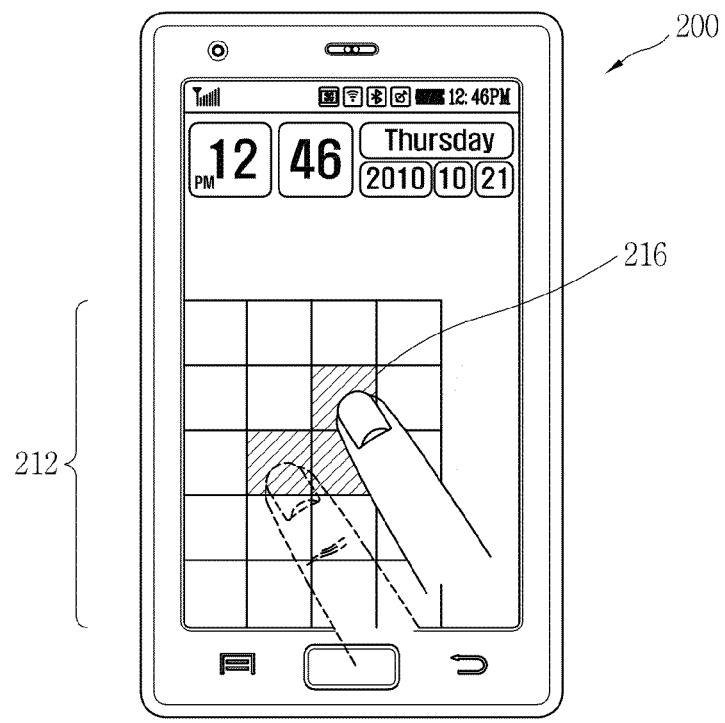

FIGS. 9A and 9B are exemplary views illustrating a case where a lock release operation gesture satisfies a lock release condition according to an embodiment of the present disclosure.

As described above, when the user's contact with the touch screen satisfies a predetermined condition, the mobile terminal 200 may be switched into a lock release state. The predetermined condition may be a contact with several number of tiles constituting the touch screen, for example.

Referring to FIG. 9A, when the user makes contact with an arbitrary location of the touch screen, the lock release region 212 containing a plurality of tiles around a tile corresponding to the contacted location may be formed. The lock release region 212 is a region for partially exposing an idle screen or a screen displayed by the mobile terminal 200 prior to the lock state as described above. It is assumed that the mobile terminal 200 is switched to a lock release screen when the movement of the users contact with the touch screen is brought into contact with at least three tiles. In other words, if the movement of the users contact with the touch screen is brought into contact with tiles 214 displayed in a visually divided manner, it is determined to satisfy the condition, and thus the mobile terminal 200 can release a lock state. Alternatively, the condition may further include an operation for releasing a contact from the lock release region 212 at the end of the operation. For example, when the movement of the users contact is brought into contact with tiles 214 and the contact is continuously moved and gets out of the lock release region 212, the lock state of the mobile terminal 200 may be released.

Referring to FIG. 9B, even when the movement of the user's contact is brought into contact with tiles 216 and the user suspends the contact and released from the touch screen, the lock state of the mobile terminal 200 may be released. The shape of tiles may reflect the authentication information of a lock release operation. In other words, the mobile terminal 200 may release the lock state only when a specific shape of tiles are brought into contact therewith, and the mobile terminal 200 does not release the lock state when other shape of tiles are brought into contact therewith.

Figure 10A:
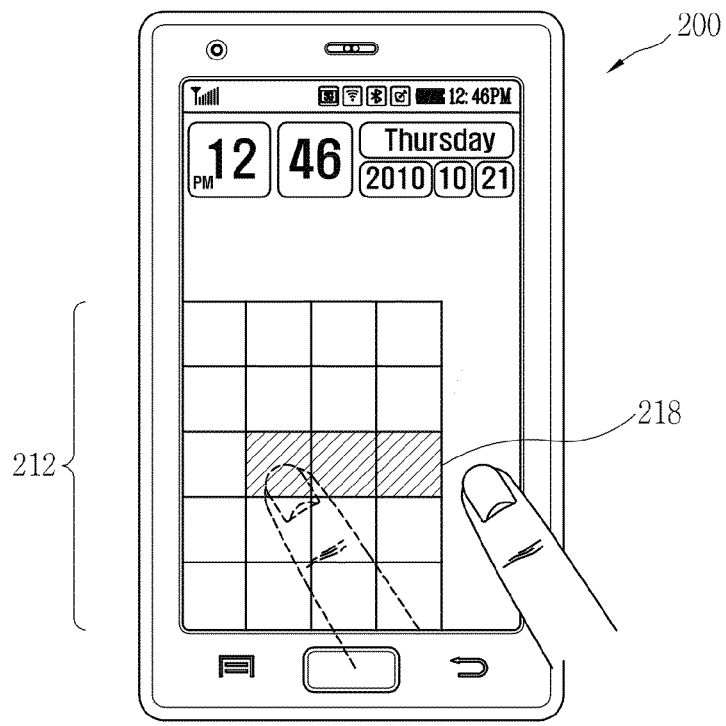
FIGS. 10A through 10C are views illustrating user feedback GUI for a lock release operation gesture according to an embodiment of the present disclosure.
Figure 10B:
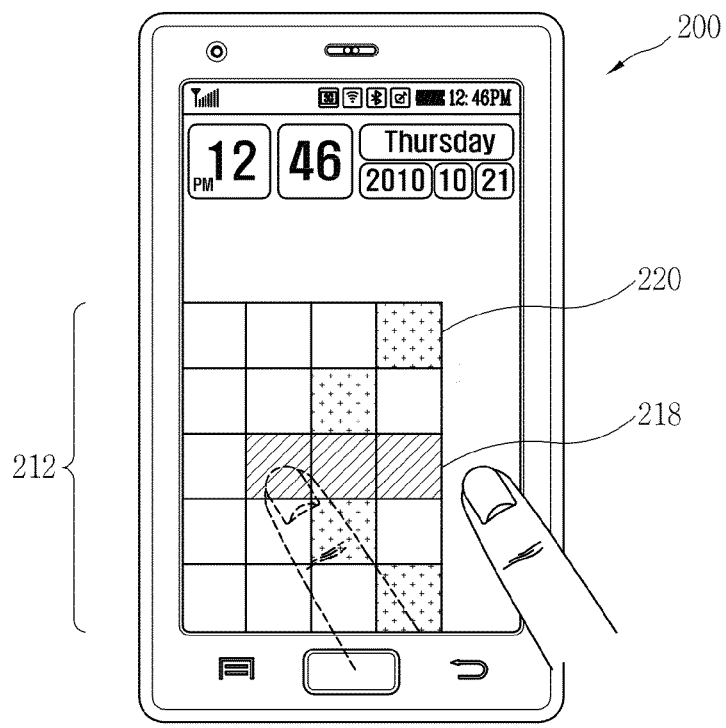
Figure 10C:
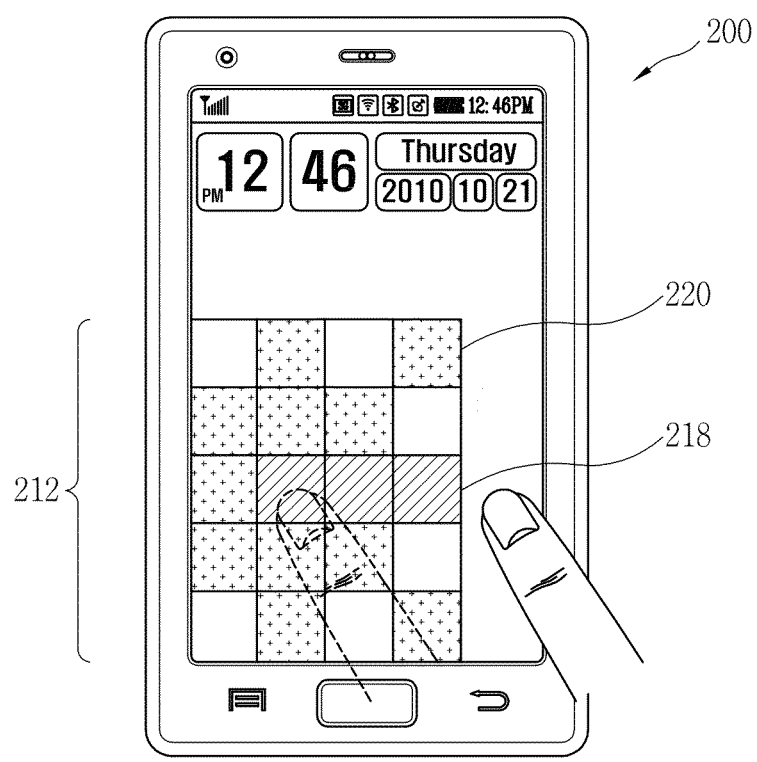

FIGS. 10A through 10C are views illustrating user feedback GUI for a lock release operation gesture according to an embodiment of the present disclosure.

Referring to FIG. 10A, while the users contact with the touch screen is moved, the contacted tiles 218 may be disappeared. Accordingly, a portion corresponding to the tiles disappeared from the lock release screen may be remarkably revealed. A user feedback to a lock release operation gesture in FIG. 10A may reflect the location of the contacted tiles.

Referring to FIG. 10B, the tiles 220 in a similar direction to the tiles 218 may be disappeared together with the tiles 218 contacted while the user's contact with the touch screen is moved. Accordingly, a portion corresponding to the tiles disappeared from the lock release screen may be remarkably revealed.

Referring to FIG. 10C, while the users contact with the touch screen is moved, the tiles 220 in all directions may be disappeared together with the tiles 218 contacted while the users contact with the touch screen is moved. Accordingly, a portion corresponding to the tiles disappeared from the lock release screen may be remarkably revealed.

According to an embodiment, the mobile terminal 200 provides a non-visual feedback for displaying the advancement to user input condition satisfaction in addition to a visual feedback. The additional feedback may include an auditory feedback (for instance, sound) or a physical feedback (for instance, vibration).

According to an embodiment, the feature of lock/lock release may be applicable to a specific application being implemented on the mobile terminal 100 as an opposite way to the mobile terminal 100 as a whole. In some embodiments, a lock release gesture allows an application to be switched to another one, and a phone application to be switched to a music player or in an opposite manner. The feature of lock/lock release may include a hold or pause characteristic. According to an embodiment, when the user switches a first application to a second application, the user interface for the second application is faded in (or increased in strength), and the user interface for the first application is faded out (or decreased in strength). The fade-in and fade-out may be generated in a flat manner for a predetermined period of time, for example, 0.2, 1 or 2 seconds. The predetermined period of time may follow a lock release gesture as a time required for the user to take the gesture.

Figure 11:
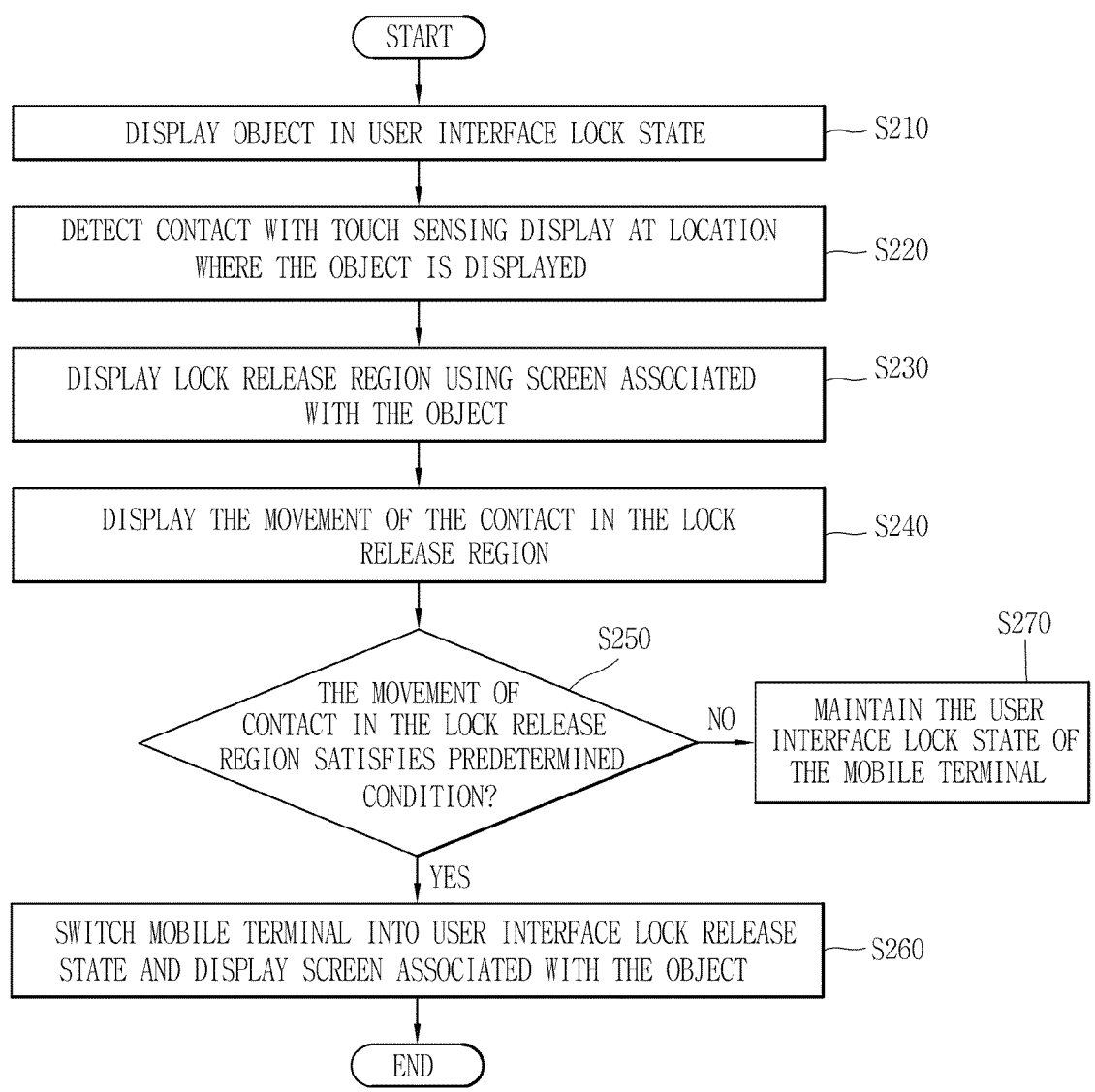
FIG. 11 is a flow chart illustrating the process of providing an application or event while switching the mobile terminal 100 into a user interface lock release state according to an embodiment of the present disclosure.

FIG. 11 is a flow chart illustrating the process of providing an application or event while switching the mobile terminal 100 into a user interface lock release state according to an embodiment of the present disclosure.

The mobile terminal 100 is set to a lock state (S210). As described above, the mobile terminal 100 may be set to a lock state when one or more lock conditions are satisfied (in other words, complete switching from another state to a lock state). The mobile terminal 100 may display a lock screen in a lock state. According to the present embodiment, the lock screen may include an object associated with an application or event. When an object is selected by the user in a lock release state, the mobile terminal 100 may display an application or event. However, when if the object is selected by the user in a lock state, the mobile terminal 100 may not immediately display the corresponding application or event. In other words, the corresponding application or event is displayed when the lock state of the mobile terminal 100 is released.

The mobile terminal 100 detects a contact at a location where an object on the touch screen is displayed (S220). The mobile terminal 100 may prepare an application corresponding to an object applicable to the location where the contact is detected on the touch screen. The application corresponding to an object applicable to the location where the contact is detected on the touch screen may maintain an execution state even in the lock state. Alternatively, the application corresponding to an object applicable to the location where the contact is detected on the touch screen may be switched into an execution state when the contact is detected. In any case, the mobile terminal 100 should be prepared to display an application corresponding to an object applicable to the detected location after the contact is detected on the touch screen.

The mobile terminal 100 displays a lock release region corresponding to the location where the contact is detected on the touch screen (S230). The lock release region may be displayed by using the application or event corresponding to an object applicable to the location at which the contact is detected. For example, as described above, an application or event corresponding to the relevant object may be displayed through a gap generated by dividing a lock release region into a plurality of tiles, and changing at least one of location and size of the plurality of tiles.

The mobile terminal 100 displays the movement of a contact in the lock release region (S240). The movement of a contact in the lock release region may be a feedback to the user's gesture for releasing the lock. For example, at least one tile corresponding to the movement of a contact in the lock release region among tiles formed in the step S230 may be allowed to be disappeared to display the movement of a contact in the lock release region.

When the contact corresponds to a successful behavior of the lock release operation in step S250, namely, when the user successfully performs the lock release operation, the mobile terminal 100 is switched into a lock release state (S260). Furthermore, the mobile terminal 100 may display an application or event corresponding to the relevant object while being switched into a lock release state.

When the contact does not correspond to an attempt for performing a lock release operation or the contact corresponds to a failure or suspension of the attempt by the user performing a lock release operation in step S250, the mobile terminal 100 maintains a lock release state (S270).

FIGS. 12A through 12E are views illustrating the display of GUI at various positions where a lock release operation gesture is taken according to an embodiment of the present disclosure.

Figure 12A:
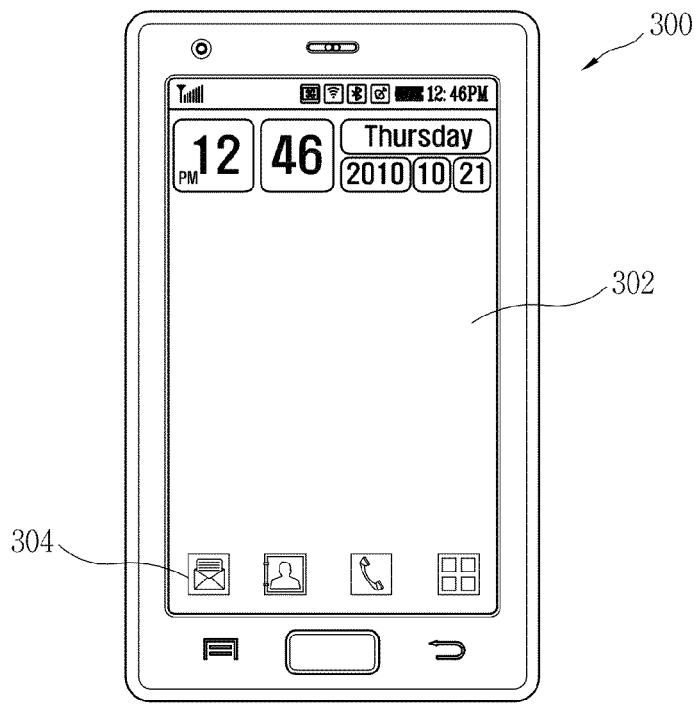
FIGS. 12A through 12E are views illustrating the display of GUI at various positions where a lock release operation gesture is taken according to an embodiment of the present disclosure.

Referring to FIG. 12A, the mobile terminal 300 is locked and displays a lock screen 302. The lock screen 302 may display an object 304 associated with an application or event.

Figure 12B:
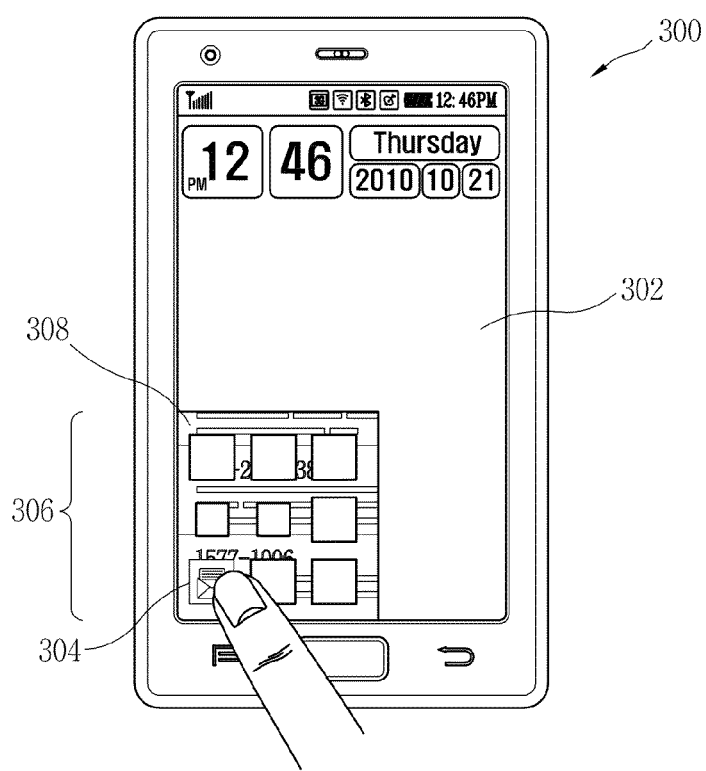

Referring to FIG. 12B, the user makes contact with the touch screen of the mobile terminal 300 to start a lock release operation. The user makes a contact with the touch screen at a location where the object 304 is displayed thereon. The users contact with the touch screen at a location where the object 304 is displayed thereon is detected by the mobile terminal 300, and the mobile terminal 300 displays a lock release region 306 containing a region in which the object 304 is located. The lock release region 306 may be continuously displayed while the user maintaining a contact on the touch screen. As described above, the mobile terminal 300 may divide the touch screen into a plurality of tiles, and change at least one of location and size of tiles constituting the lock release region 306 containing a tile corresponding to the object 304 on the touch screen, thereby allowing an application or event to be displayed at a gap between the tiles. In this case, the mobile terminal 300 allows a tile corresponding to the object 304 to be disappeared, thereby remarkably displaying the application or event for the relevant portion.

Figure 12C:
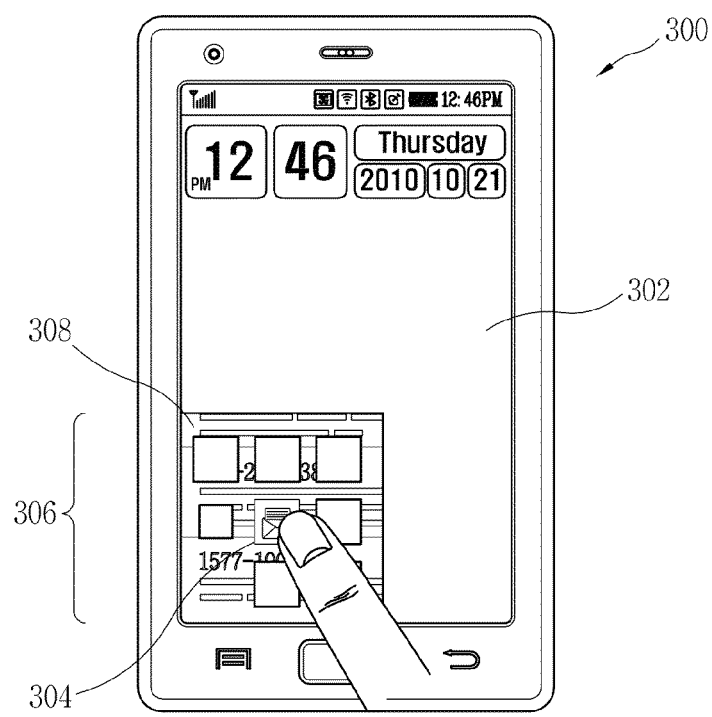

Referring to FIG. 12C, the user moves his or her finger while maintaining a continuous contact with the touch screen, thereby participating in the process of taking a gesture. As a result of the gesture, an application or event 308 of the tile corresponding to the movement of the contact may be remarkably displayed. In this case, an animation effect may be implemented such that a tile corresponding to the movement of the contact is rotated around a predetermined axis, flown out of the screen, or disappeared.

Figure 12D:
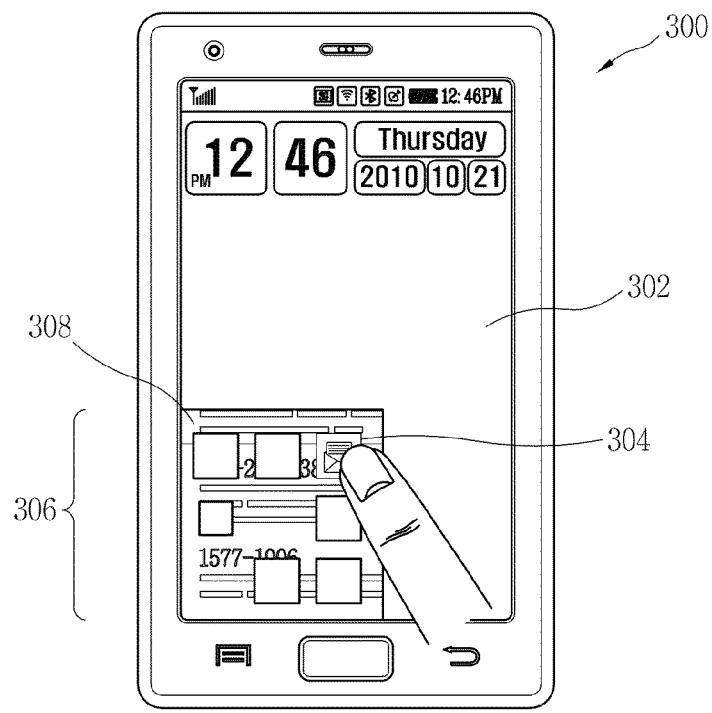

Referring to FIG. 12D, the user subsequently moves his or her finger while maintaining a continuous contact with the touch screen, thereby participating in the process of taking a gesture. As a result of the gesture, an application or event 308 of the tile corresponding to the movement of the contact may be remarkably revealed. When the movement of the users contact satisfies a predetermined condition (for example, when brought into contact with three or more tiles), and if the user releases his or her finger from the touch screen, then the lock release operation is completed. During the completion of a lock release gesture, the mobile terminal 200 is lock-released to display the application or event 308 on the touch screen.

Figure 12E:
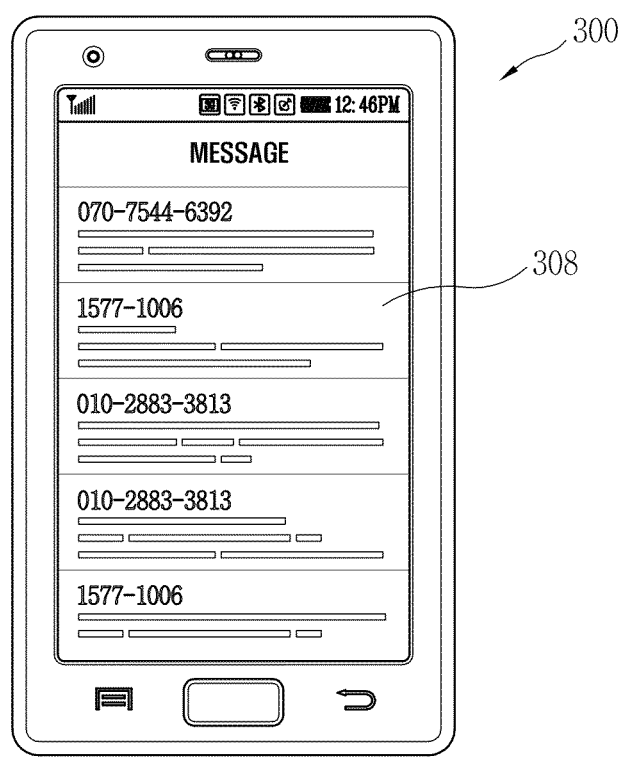

FIG. 12E illustrates an example of the application or event 308 that can be displayed when the mobile terminal 200 is lock-released.

Figure 13A:
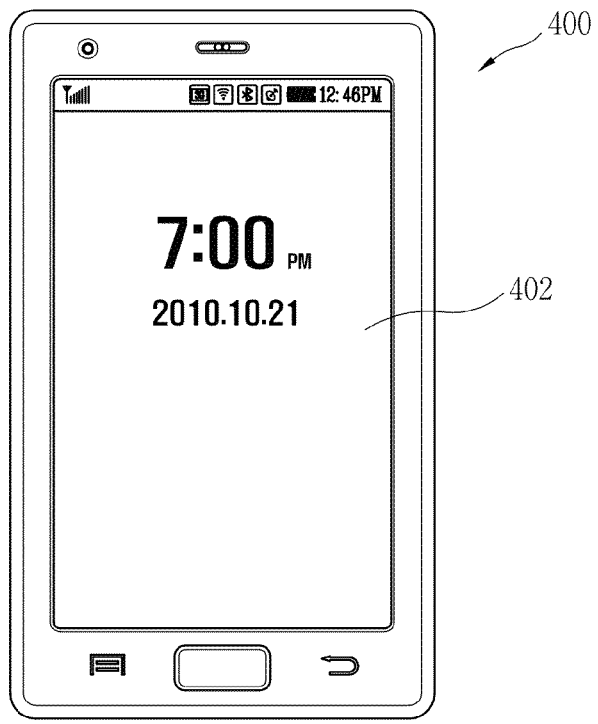
FIGS. 13A through 13C are views illustrating the display of GUI at various positions where a lock release operation gesture is taken according to an embodiment of the present disclosure.
Figure 13B:
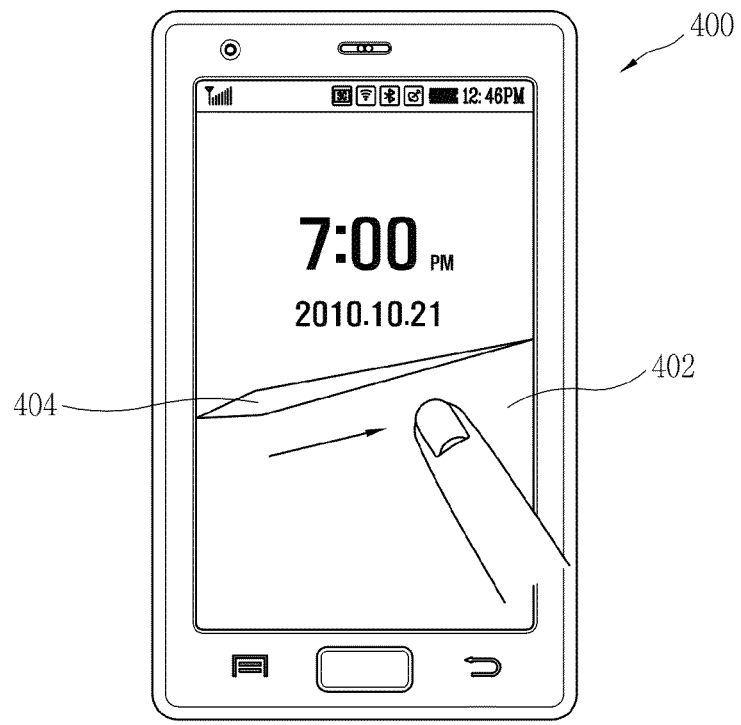
Figure 13C:
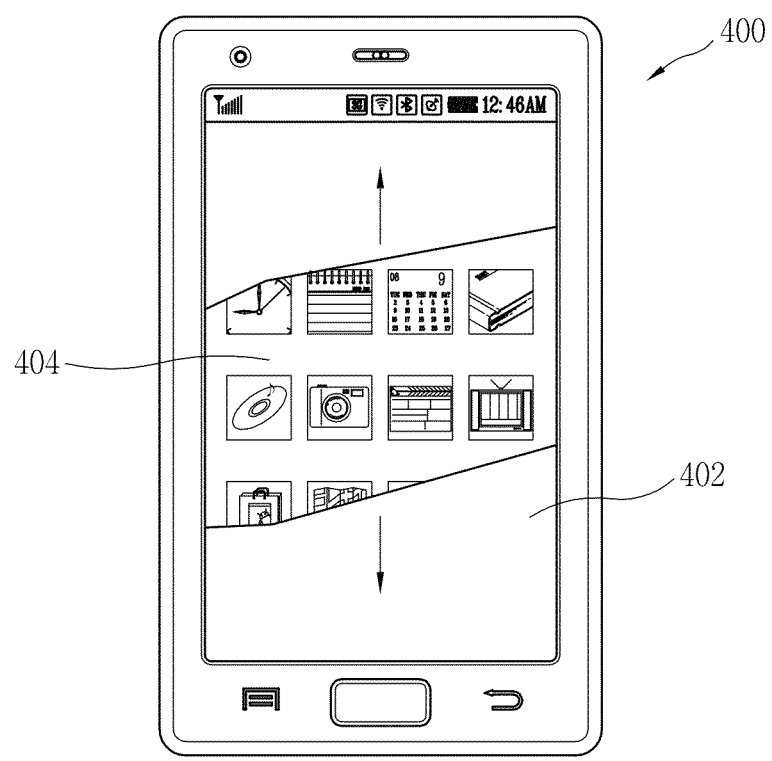

FIGS. 13A through 13C are views illustrating the display of GUI at various positions where a lock release operation gesture is taken according to an embodiment of the present disclosure.

When a predetermined condition is satisfied without considering that the users contact with the touch screen may be a lock release operation, the lock state of the mobile terminal 400 may be released. For example, a flick gesture performed on the touch screen is a quick finger sweeping drag, and the mobile terminal 400 can determine whether a predetermined condition is satisfied without displaying a lock release region during a gesture performed in a quick period of time.

Referring to FIG. 13A, the mobile terminal 400 may include a touch screen for displaying a lock screen 402 in a lock state. According to an embodiment, the touch screen may be in a sleep mode and/or a state in which nothing is displayed thereon at first, and may be displayed by the mobile terminal 400 when an event requiring the user's notice occurs (for example, incoming call or message) or during the users intervention (for example, a menu button (not shown) for displaying a lock screen is displayed while the mobile terminal 400 is locked).

Referring to FIG. 13B, the user drags the touch screen of the mobile terminal 400 using his or her finger to start a lock release operation. The lock release operation may include a drag and release operation being carried out by the user from an arbitrary location to another location on the touch screen. For example, the lock release operation may include an operation for quickly dragging from a corner of the touch screen to another corner thereof and then releasing it. For another example, the lock release operation may include an operation for quickly dragging from an edge of the touch screen to the edge of the opposite side thereof and then releasing it. The mobile terminal 400 may expose an idle screen or a screen 404 displayed prior to the lock state at a portion brought into contact according to the user's drag. The mobile terminal 400 detects the length and/or speed of a drag, and the lock state of the mobile terminal 400 can be released when a predetermined condition (for example, a drag is carried out on three or more tiles or the drag and release operation is completed within 0.1 second. When the length and/or speed of the drag does not satisfy a predetermined condition, the mobile terminal 400 continuously maintains the lock state.

Referring to FIG. 13C, when the length and/or speed of the drag satisfies a predetermined condition, the mobile terminal 400 may release the lock state of the mobile terminal 400, and completely expose an idle screen or a screen 404 displayed by the mobile terminal 400 prior to the lock state. As the lock screen 402 is scrolled from a portion dragged by the user to an edge portion, the mobile terminal 400 may gradually expose an idle screen or a screen 404 displayed by the mobile terminal 400 prior to the lock state.

According to an embodiment of the present disclosure, the mobile terminal provides a sensible and sensuous guide and feedback for a lock release operation, thereby having an effect of enhancing a degree of freedom of a gesture for the lock release operation.

Furthermore, according to an embodiment of the present disclosure, a guide and feedback for a lock release operation is provided using an application or event, thereby having an effect of providing user experience through an intuitive interface.

It should be understood that the foregoing embodiments are merely illustrative but not restrictive in all aspects. The scope of the present invention is defined by the appended claims rather than by the detailed description, and all changes or modifications derived from the meaning, scope and equivalent concept of the claims should be construed to be embraced by the scope of the present invention.

What is claimed is:

1. A method of releasing a locked state of a mobile terminal, the method comprising:
    displaying, on a touchscreen during an unlocked state, a background screen;
    changing the mobile terminal from the unlocked state to the locked state;
    displaying, on the touchscreen during the locked state, a lock screen;
    displaying a lock release region on the lock screen in response to a touch received at the touchscreen, wherein the lock release region comprises a plurality of portions, wherein the lock release region defines at least one gap located between adjacent portions of the plurality of portions of the lock release region;
    displaying, during the locked state and while the touch is being received, a portion of the background screen within the at least one gap of the lock release region; and
    changing the mobile terminal from the locked state to the unlocked state in response to a further input.

2. The method of claim 1, wherein the lock screen obscures the background screen.

3. The method of claim 1, wherein the lock release region is less than an entire portion of the lock screen.

4. The method of claim 1, further comprising:
    changing displayed locations of the plurality of portions of the lock release region in response to a drag input extending from the touch.

5. The method of claim 1, further comprising:
    displaying the lock release region at a location of the touchscreen that corresponds to a location at which the touch is received.

6. The method of claim 1, wherein the locked state is changed to the unlocked state when the further input is a drag input over a threshold distance.

7. The method of claim 1, wherein the locked state is changed to the unlocked state when the further input is a drag input that meets a threshold speed.

8. The method of claim 1, wherein the touch occurs at any of a plurality of arbitrary positions of the touchscreen.

9. The method of claim 1, wherein size of each portion of the plurality of portions is different.

10. The method of claim 1, wherein the adjacent portions of the plurality of portions are shaped to be concave.

11. The method of claim 1, the method further comprising:
    providing an auditory feedback to signal the changing from the locked state to the unlocked state.

12. The method of claim 1, wherein the plurality of portions are respectively corresponding to different parts of the lock screen.

13. A mobile terminal, comprising:
    a touchscreen; and
    a controller configured to:
        cause displaying, on the touchscreen during an unlocked state, a background screen;
        change the mobile terminal from the unlocked state to the locked state;
        cause displaying, on the touchscreen during the locked state, a lock screen;
        cause displaying a lock release region on the lock screen in response to a touch received at the touchscreen, wherein the lock release region comprises a plurality of portions, and wherein the lock release region defines at least one gap located between adjacent portions of the plurality of portions of the lock release region;
        cause displaying, during the locked state and while the touch is being received, a portion of the background screen within the at least one gap of the lock release region; and
        change the mobile terminal from the locked state to the unlocked state in response to a further input.

14. The mobile terminal of claim 13, wherein the lock screen obscures the background screen.

15. The mobile terminal of claim 13, wherein the lock release region is less than an entire portion of the lock screen.

16. The mobile terminal of claim 13, wherein the controller is further configured to:
    change displayed locations of the plurality of portions of the lock release region in response to a drag input extending from the touch.

17. The mobile terminal of claim 13, wherein the controller is further configured to:
    cause displaying of the lock release region at a location of the touchscreen that corresponds to a location at which the touch is received.

18. The mobile terminal of claim 13, wherein the locked state is changed to the unlocked state when the further input is a drag input over a threshold distance.

19. The mobile terminal of claim 13, wherein the locked state is changed to the unlocked state when the further input is a drag input that meets a threshold speed.

20. The mobile terminal of claim 13, wherein the touch occurs at any of a plurality of arbitrary positions of the touchscreen.

21. The mobile terminal of claim 13, wherein size of each portion of the plurality of portions is different.

22. The mobile terminal of claim 13, wherein the adjacent portions of the plurality of portions are shaped to be concave.

23. The mobile terminal of claim 13, further comprising:
    a speaker, wherein the controller is further configured to:
    provide an auditory feedback via the speaker to signal the changing from the locked state to the unlocked state.

24. The mobile terminal of claim 13, wherein the plurality of portions are respectively corresponding to different parts of the lock screen.

* * * * *